(12) United States Patent
Sievers

(10) Patent No.: US 9,303,942 B2
(45) Date of Patent: Apr. 5, 2016

(54) THROWING DEVICE

(71) Applicant: Roger Sievers, Meppen, IL (US)

(72) Inventor: Roger Sievers, Meppen, IL (US)

( * ) Notice: Subject to any disclaimer, the term of this patent is extended or adjusted under 35 U.S.C. 154(b) by 0 days.

(21) Appl. No.: 14/258,855

(22) Filed: Apr. 22, 2014

(65) Prior Publication Data

US 2014/0311470 A1    Oct. 23, 2014

Related U.S. Application Data

(60) Provisional application No. 61/814,561, filed on Apr. 22, 2013.

(51) Int. Cl.
| | |
|---|---|
| *F41B 3/03* | (2006.01) |
| *F41B 7/08* | (2006.01) |
| *A63B 65/12* | (2006.01) |
| *F41B 3/00* | (2006.01) |
| *A01K 15/02* | (2006.01) |
| *A63H 27/14* | (2006.01) |
| *A63H 33/18* | (2006.01) |
| *F41B 3/04* | (2006.01) |

(52) U.S. Cl.
CPC .............. *F41B 3/005* (2013.01); *A01K 15/025* (2013.01); *A63B 65/122* (2013.01); *A63H 27/14* (2013.01); *A63H 33/18* (2013.01); *F41B 3/03* (2013.01); *F41B 3/04* (2013.01)

(58) Field of Classification Search
CPC ......... A63B 69/408; F41B 3/03; F41B 3/005; A01K 15/025
USPC ................ 124/6, 7, 16, 36, 41.1, 17; 119/702
See application file for complete search history.

(56) References Cited

U.S. PATENT DOCUMENTS

| | | | | |
|---|---|---|---|---|
| 1,091,512 A | * | 3/1914 | Hoffman | A63B 69/408 124/36 |
| 1,100,728 A | * | 6/1914 | Gould | A63B 69/408 124/16 |
| 1,268,187 A | * | 6/1918 | Velk | A63B 69/408 124/7 |
| 1,352,681 A | * | 9/1920 | Nicols | F41B 7/00 124/29 |
| 1,535,029 A | * | 4/1925 | Murch | A63B 47/02 124/5 |
| 2,006,309 A | * | 6/1935 | Clark | 554/71 |
| 2,318,139 A | * | 5/1943 | Calabrese | F41B 3/03 124/35.1 |
| 2,653,592 A | * | 9/1953 | Sowitsky | F41B 3/03 124/16 |
| 2,665,677 A | * | 1/1954 | Whitlock | F41B 3/005 124/17 |
| 2,763,256 A | * | 9/1956 | Scott | F41C 27/06 124/7 |
| 3,245,170 A | * | 4/1966 | MacDonald | A01K 91/02 124/16 |
| 3,428,036 A | * | 2/1969 | Parker | 124/5 |
| 3,470,859 A | * | 10/1969 | Ponza | 124/7 |
| 3,589,349 A | * | 6/1971 | Parker | 124/5 |
| 3,605,715 A | * | 9/1971 | Welbourn | F41B 3/03 124/36 |
| 3,638,633 A | * | 2/1972 | Clark | F41B 3/03 124/4 |

(Continued)

OTHER PUBLICATIONS

Patent Cooperation Treaty, International Search Report issued on PCT/US2014/035006, dated Sep. 2, 2014, 3 pages.

*Primary Examiner* — Alexander Niconovich
(74) *Attorney, Agent, or Firm* — Bryan Cave LLP

(57) ABSTRACT

Throwing devices are described. In one embodiment, a throwing device includes a spring-actuated throwing arm wherein a cup member is disposed at an end of the throwing arm and is adapted to allow a user to pick up an object to be thrown by the throwing device without touching the object. In another embodiment, a throwing device includes a tension adjustment member, by which a user can adjust the tension applied to the launching spring, thereby adjusting the launch range of the throwing device.

28 Claims, 30 Drawing Sheets

(56) References Cited

U.S. PATENT DOCUMENTS

| | | | | | |
|---|---|---|---|---|---|
| 3,760,787 A * | 9/1973 | Kahelin | ............... | A63B 69/408 | |
| | | | | 124/16 | |
| 3,777,733 A * | 12/1973 | Mitchell | ................... | F41B 3/03 | |
| | | | | 124/16 | |
| 3,794,325 A * | 2/1974 | Stender | ..................... | A63F 9/02 | |
| | | | | 124/36 | |
| 3,926,170 A * | 12/1975 | Dixon | .................. | A63B 69/408 | |
| | | | | 124/41.1 | |
| 3,951,125 A * | 4/1976 | Dixon | .................. | A63B 69/408 | |
| | | | | 124/36 | |
| 3,977,386 A * | 8/1976 | Meyer | .................. | A63B 69/408 | |
| | | | | 124/36 | |
| 4,015,578 A * | 4/1977 | Wright | ..................... | F41B 3/03 | |
| | | | | 124/36 | |
| 4,082,076 A * | 4/1978 | Perry | ....................... | F41B 3/03 | |
| | | | | 124/34 | |
| 4,170,215 A * | 10/1979 | Kettlestrings | ............. | F41B 7/08 | |
| | | | | 124/16 | |
| 4,220,130 A * | 9/1980 | Glover | ................. | A63B 69/408 | |
| | | | | 124/36 | |
| 4,269,162 A * | 5/1981 | Abraham | ............. | A63B 69/408 | |
| | | | | 124/41.1 | |
| 4,391,264 A * | 7/1983 | Abraham | ............. | A63B 69/408 | |
| | | | | 124/36 | |
| 4,611,571 A * | 9/1986 | Tressler | ............... | A63B 69/408 | |
| | | | | 124/7 | |
| 4,784,107 A * | 11/1988 | Kelly | ..................... | A63B 69/40 | |
| | | | | 124/48 | |
| 4,995,371 A * | 2/1991 | Kuizinas | ............. | A63B 47/002 | |
| | | | | 124/36 | |
| 5,619,977 A * | 4/1997 | Gatin | ................... | A63B 69/408 | |
| | | | | 124/16 | |
| 5,660,386 A * | 8/1997 | Krieger | ................ | A63B 69/407 | |
| | | | | 124/7 | |
| 5,975,527 A * | 11/1999 | Winchester | .......... | A63B 69/408 | |
| | | | | 124/36 | |
| 6,076,829 A * | 6/2000 | Oblack | .................. | A63B 59/20 | |
| | | | | 124/5 | |
| 6,102,405 A * | 8/2000 | Spikes | .................. | A63F 9/0073 | |
| | | | | 273/351 | |
| 6,129,076 A * | 10/2000 | Powell | ................. | A63B 69/408 | |
| | | | | 124/36 | |
| 6,477,745 B2 * | 11/2002 | Strebl | ............................. | 24/3.12 | |
| 6,655,370 B1 * | 12/2003 | Beckwith | ............... | F41B 3/005 | |
| | | | | 124/16 | |
| 7,415,976 B1 * | 8/2008 | Powell | ...................... | F41B 3/04 | |
| | | | | 124/16 | |
| 7,438,068 B2 * | 10/2008 | Nanguneri | ........... | A63B 69/408 | |
| | | | | 124/16 | |
| 7,677,994 B2 * | 3/2010 | Matsumoto et al. | .......... | 473/510 | |
| 7,686,001 B2 * | 3/2010 | Fitt | .................................... | 124/5 | |
| 8,245,702 B2 * | 8/2012 | Lendvay | ............. | A01K 15/025 | |
| | | | | 124/16 | |
| 8,393,299 B1 * | 3/2013 | Bernat | ................. | A01K 15/025 | |
| | | | | 119/702 | |
| 8,418,681 B2 * | 4/2013 | Levin | ................... | A01K 15/025 | |
| | | | | 124/5 | |
| 8,517,003 B2 * | 8/2013 | Fisher | ............................. | 124/5 | |
| 8,857,419 B2 * | 10/2014 | Hansen | ................ | A63B 65/122 | |
| | | | | 124/5 | |
| 8,887,707 B2 * | 11/2014 | Minneman et al. | ................ | 124/5 | |
| 8,984,736 B2 * | 3/2015 | Radocy | ....................... | 29/525.01 | |
| 2005/0263962 A1 * | 12/2005 | Roh | ..................... | A01K 15/025 | |
| | | | | 273/317 | |
| 2009/0159058 A1 | 6/2009 | Nanguneri | | | |
| 2012/0006309 A1 | 1/2012 | Levin et al. | | | |
| 2013/0333679 A1 * | 12/2013 | Kroll | ..................... | A63B 69/408 | |
| | | | | 124/7 | |

\* cited by examiner

THROWING DEVICE

RELATED APPLICATION

This application claims priority to U.S. Provisional Patent App. No. 61/814,561, filed on Apr. 22, 2013, the contents of which are incorporated herein by reference in their entirety.

FIELD OF THE DISCLOSURE

This invention relates to a throwing device and, more particularly, to a device for shooting or launching a ball, pet toy, or other projectile.

BACKGROUND

Games involving throwing, catching, and/or retrieving ("throw and catch games") are popular. Any number of objects, including a wide variety of balls (such as tennis balls, footballs, baseballs, and the like), toy darts, pet toys, clay pigeons, and other appropriate objects, can be caught, thrown, or retrieved in catch and throw games. Catch and throw games are popular among people of all ages. Additionally, such games are commonly played by a dog and the dog's human companion. Catch and throw games may be played for a variety of purposes, such as entertainment, improvement of skills, exercise, or training (such as hunting dog training).

Some people who might wish to participate in a catch and throw game may have difficulty throwing an object and/or retrieving an object due to age, lack of strength, disability, or infirmity. For example, some people who might wish to play a catch and throw game with a dog may have difficulty bending over to pick up an object that has been retrieved by a dog. Furthermore, some people may find it unpleasant to pick up an object that has been in a dog's mouth.

SUMMARY OF DISCLOSURE

Among the various aspects of the present disclosure are the provision of a throwing device that includes a body having a grip, a trigger, a spring, and a spring-actuated throwing arm.

Briefly, in one aspect, the present disclosure is directed to a throwing device that includes a body having a grip, a trigger, and a spring-actuated throwing arm, in which the throwing arm includes a cup member adapted to receive one or more objects for use in a catch and throw game. In this aspect, the throwing arm is adapted to be engaged by or near the body of the throwing deice when in a cocked position and to be released when the trigger is activated.

In another aspect, the cup member is adapted to releasably engage an object, such as an object for use in a catch and throw game. Engagement features, such as fingers, may operate to hold an object within the cup member while substantially at rest and release the object when throwing arm is released from a cocked position.

In yet another aspect, a throwing device includes a torque adjustment member adapted to apply or release tension from a spring actuating the throwing arm.

In a further aspect, a throwing device includes a shroud wholly or partially enclosing the throwing arm as it moves from a cocked position to a throwing position.

In yet another aspect, a throwing device releases an object in a relatively constant trajectory relative to the body of the throwing device and, in a particular embodiment, will release an object such that its initial trajectory is relatively parallel to a horizontal plane of the throwing device.

Other objects and features of the present invention will be in part apparent and in part pointed out hereinafter.

DETAILED DESCRIPTION

Figure 1:
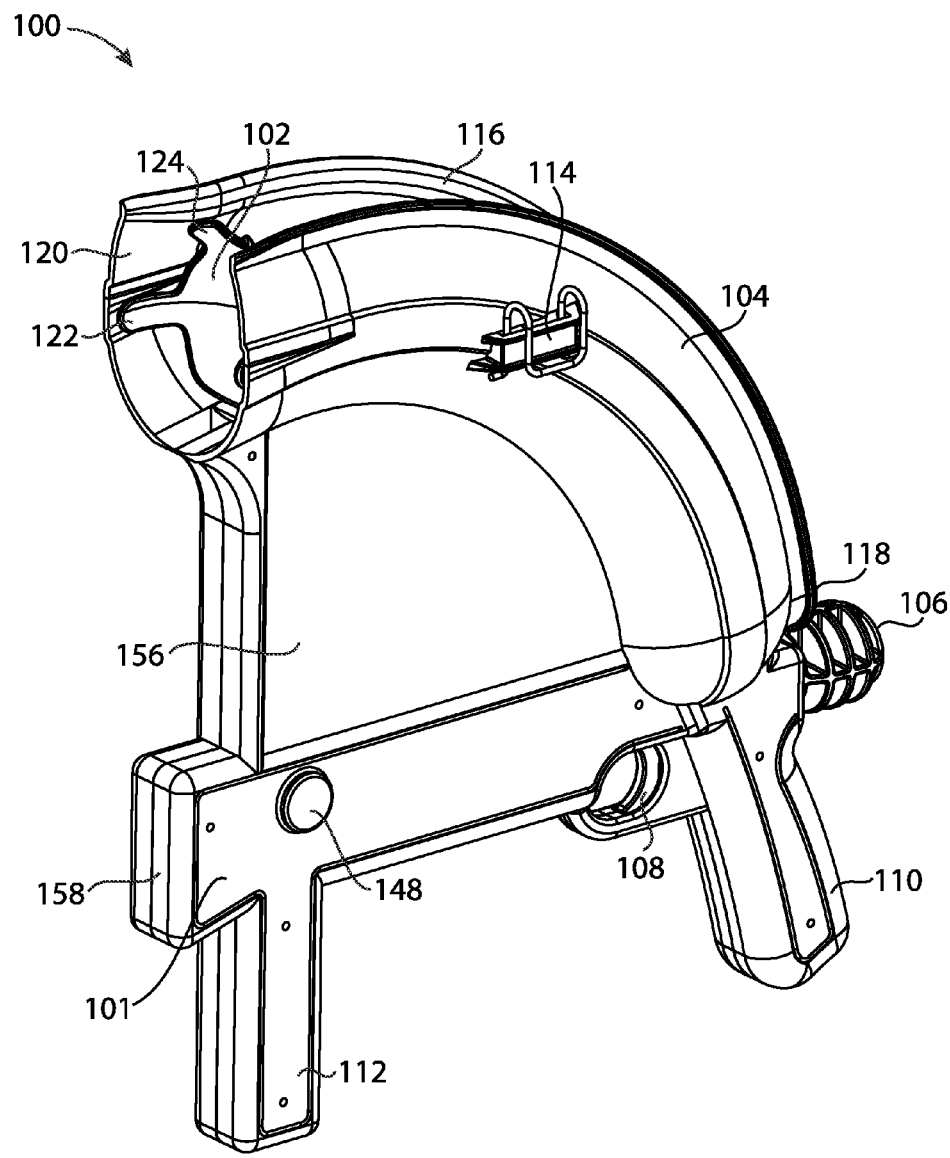
FIG. 1 is a perspective view of a throwing device, according to an example embodiment.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "rear," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

All numbers expressing measurements and so forth used in the specification and claims are to be understood as being modified in all instances by the term "about."

Unless defined otherwise, all technical and scientific terms used herein have the same meaning as commonly understood by one of ordinary skill in the art to which the disclosure pertains. Although a number of methods and materials similar or equivalent to those described herein can be used in the practice of the present disclosure, the preferred materials and methods are described herein.

Turning now to the Figures, FIGS. 1-11 illustrate a throwing device 100 according to an embodiment. In this embodiment, throwing device 100 includes a body 101 having a front grip 112, a rear grip 110, a trigger 108, and a throwing arm 144.

Throwing arm 144 includes handle 145 and cup member 102. Cup member includes fingers 122, 140 extending upward from the side of the cup member 102. Fingers 122, 140 are positioned near the center of cup member 102 and curve inward. Fingers 122, 140 may be adapted to receive an object to be thrown by throwing device 100 and may grip an object placed in the cup member, such as ball 138 or toy 150.

Fingers 124, 125 extend upward from the top of cup member. Fingers 124, 125 curve inward and may dictate or influence the trajectory of an object launched using throwing device 100. The radius of the curve of the cup member may be relatively larger near the base of the cup member (e.g., where the cup member meets or becomes the handle) and relatively smaller near the top of the cup member (e.g., at and extending into fingers 124, 125). Fingers 124, 125 may cause an object to launch with an initial trajectory which is generally parallel to body 10 of the throwing device 100 (e.g., generally parallel to throwing arm 144 when in cocked position).

Notch 127 may be adapted to receive an object to be launched by throwing device 100, such as toy 150 or the fuselage of a toy airplane.

Embodiments of throwing arms, including throwing arms that may be used in throwing devices 100, 300, 400, 500, 600, 700, are illustrated in FIGS. 27A-27G and 28A-28D and are described in further detail below.

Throwing arm 144 is adapted to move about a pivot point 148 along a throwing arm path 116 between positions at a cocking end 118 of the throwing device and a launching end 120.

Figure 3:
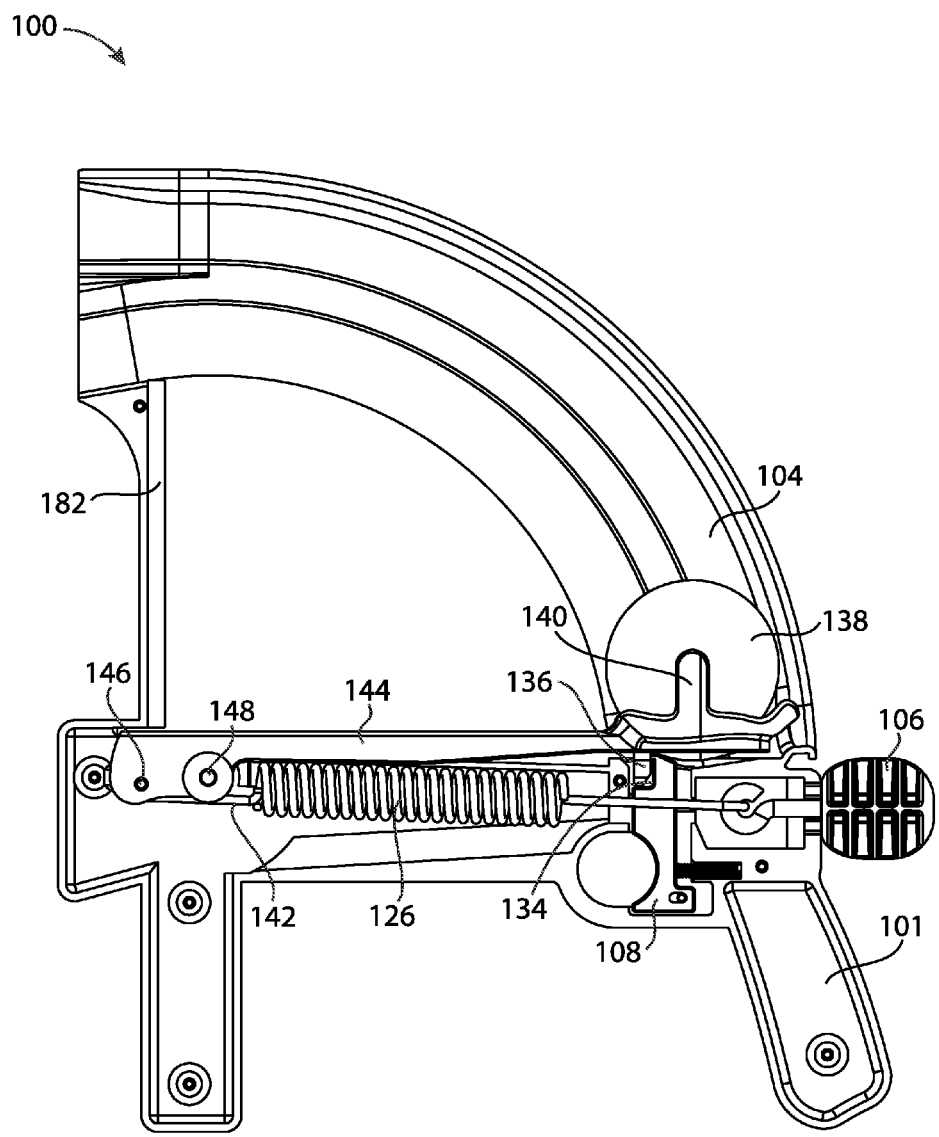
FIGS. 3 and 4 are left side, cutaway views of the throwing device of FIG. 1, wherein the throwing arm is in a cocked position.
Figure 4:
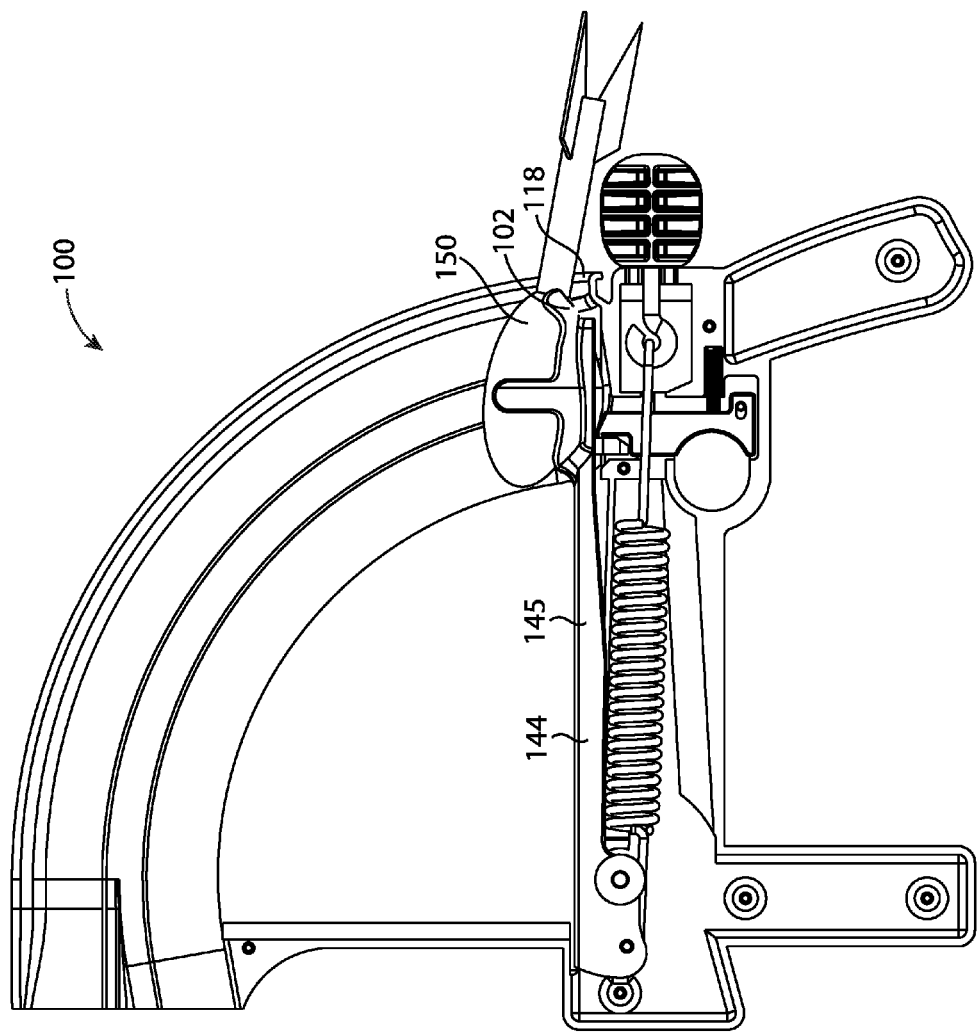
Figure 5:
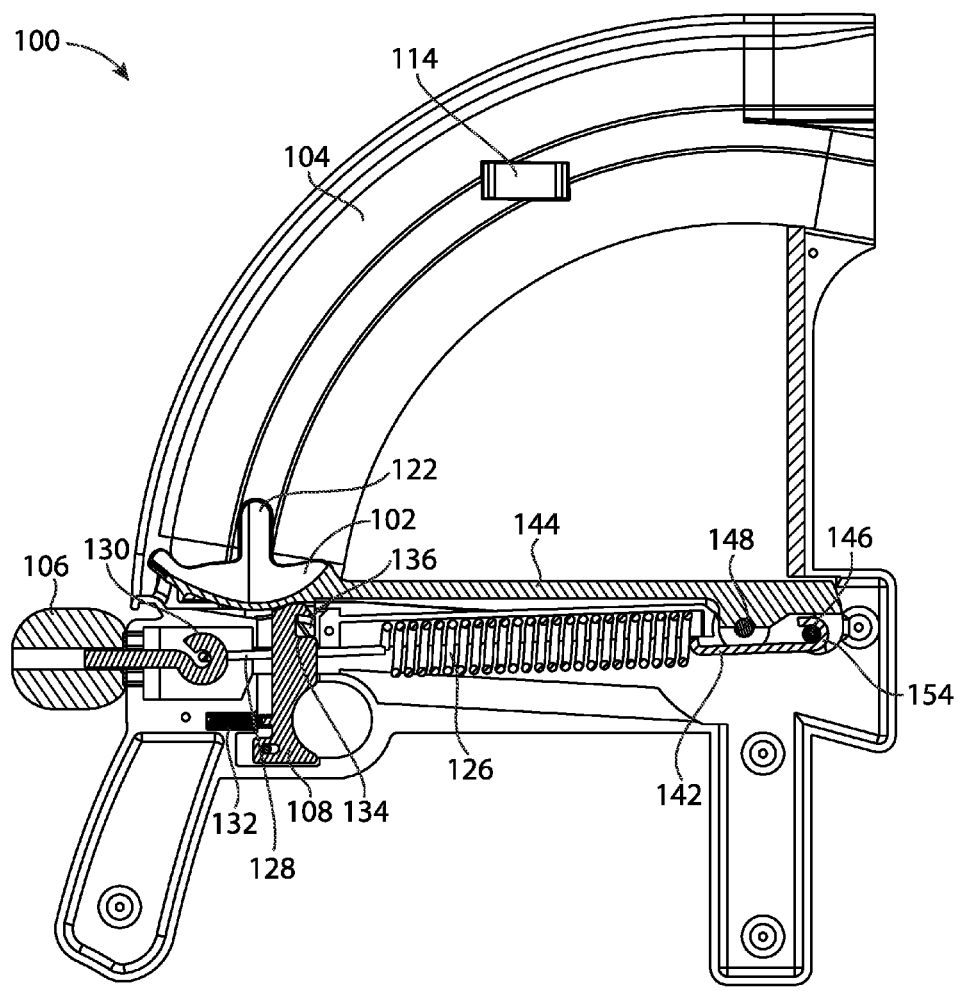
FIG. 5 is a right side, section view of the throwing device of FIG. 1, wherein the throwing arm is in a cocked position.
Figure 6:
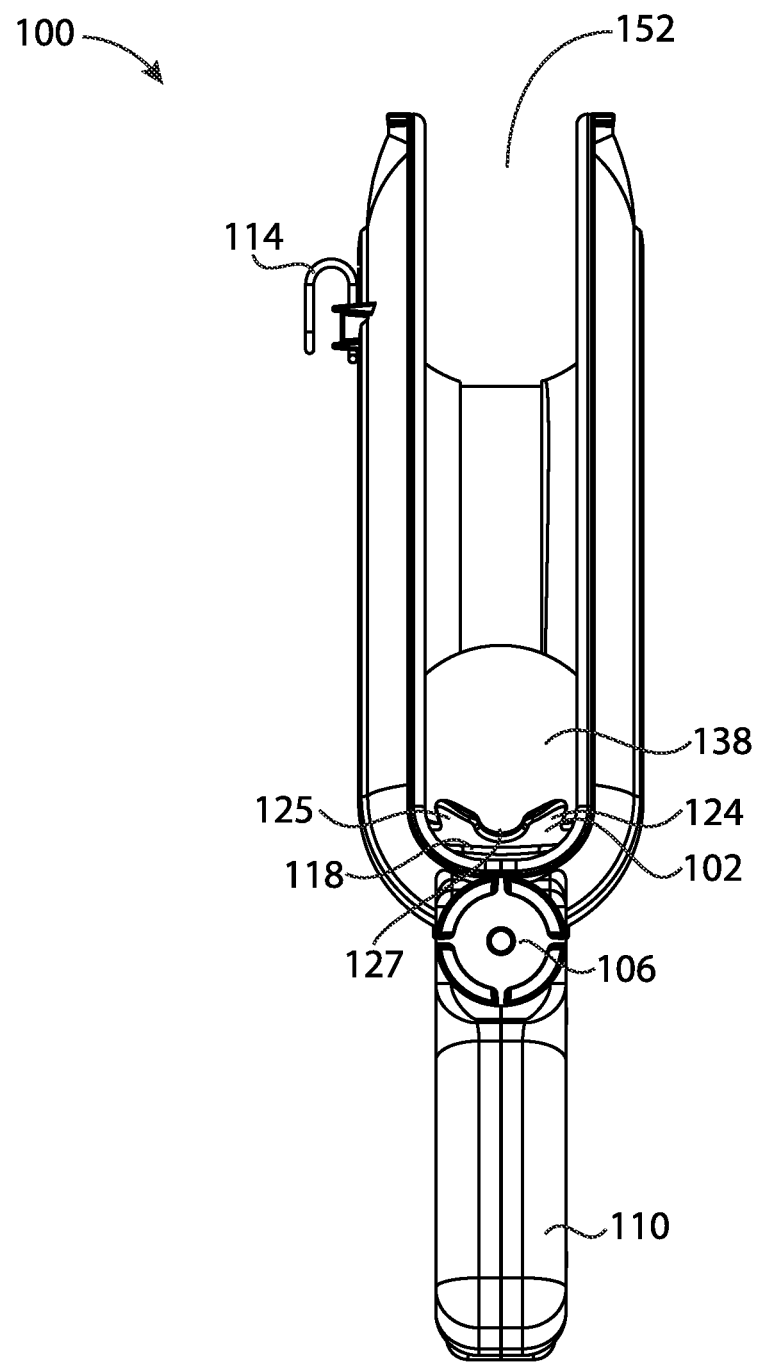
FIG. 6 is a rear view of the throwing device of FIG. 1, wherein the throwing arm is in a cocked position.
Figure 7:
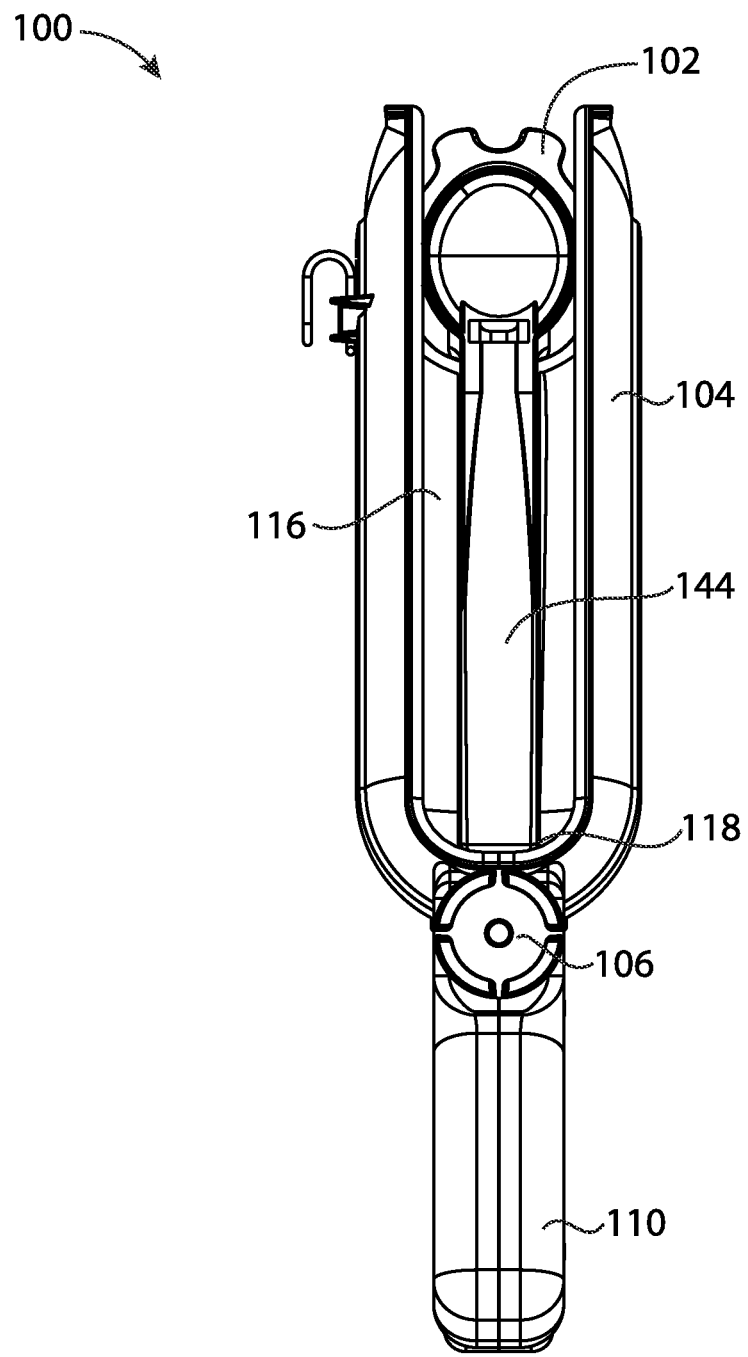
FIG. 7 is a rear view of the throwing device of FIG. 1, wherein the throwing arm is in a throwing position.
Figure 8:
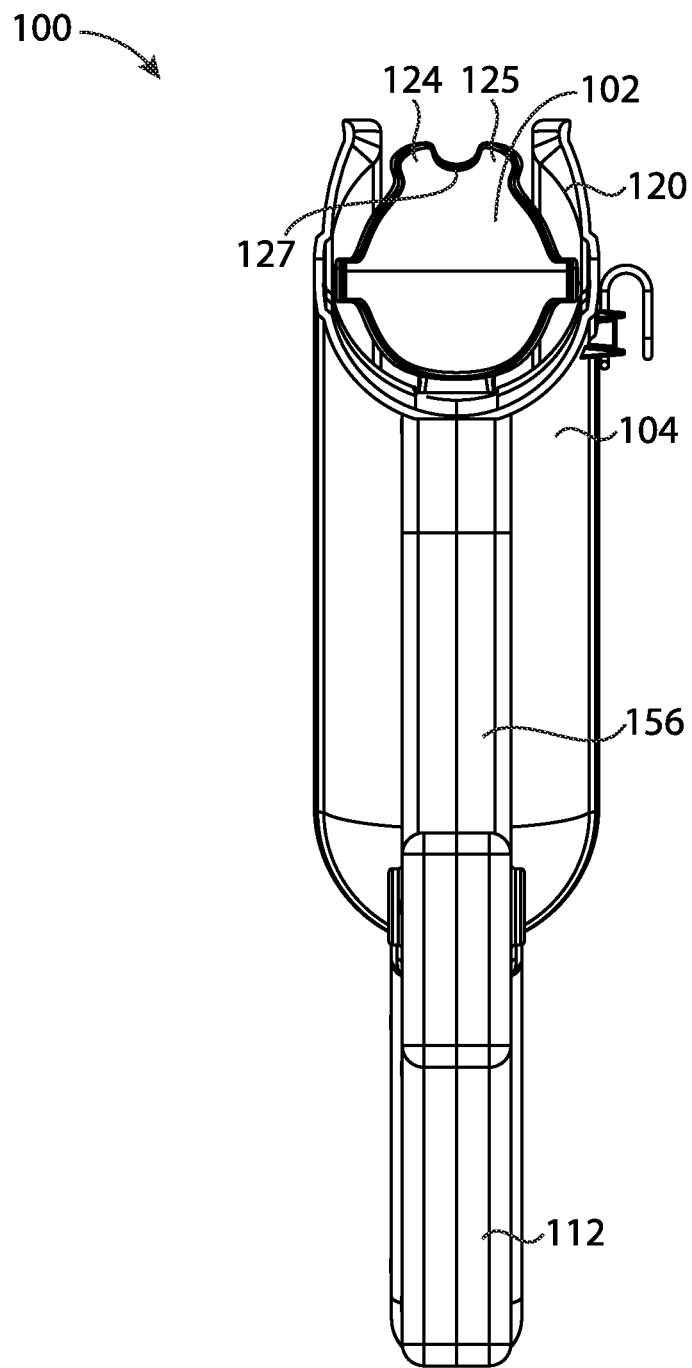
FIG. 8 is a front view of the throwing device of FIG. 1, wherein the throwing arm is in a throwing position.
Figure 9:
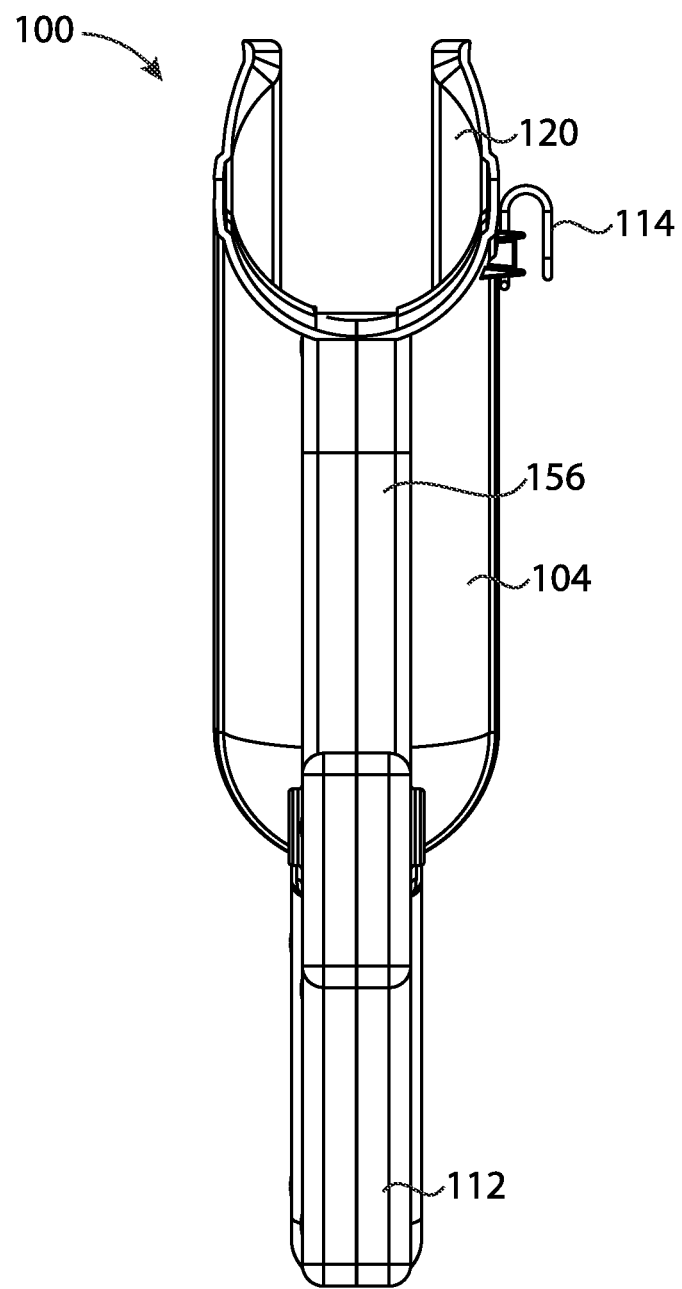
FIG. 9 is a front view of the throwing device of FIG. 1, wherein the throwing arm is in a cocked position.
Figure 10:
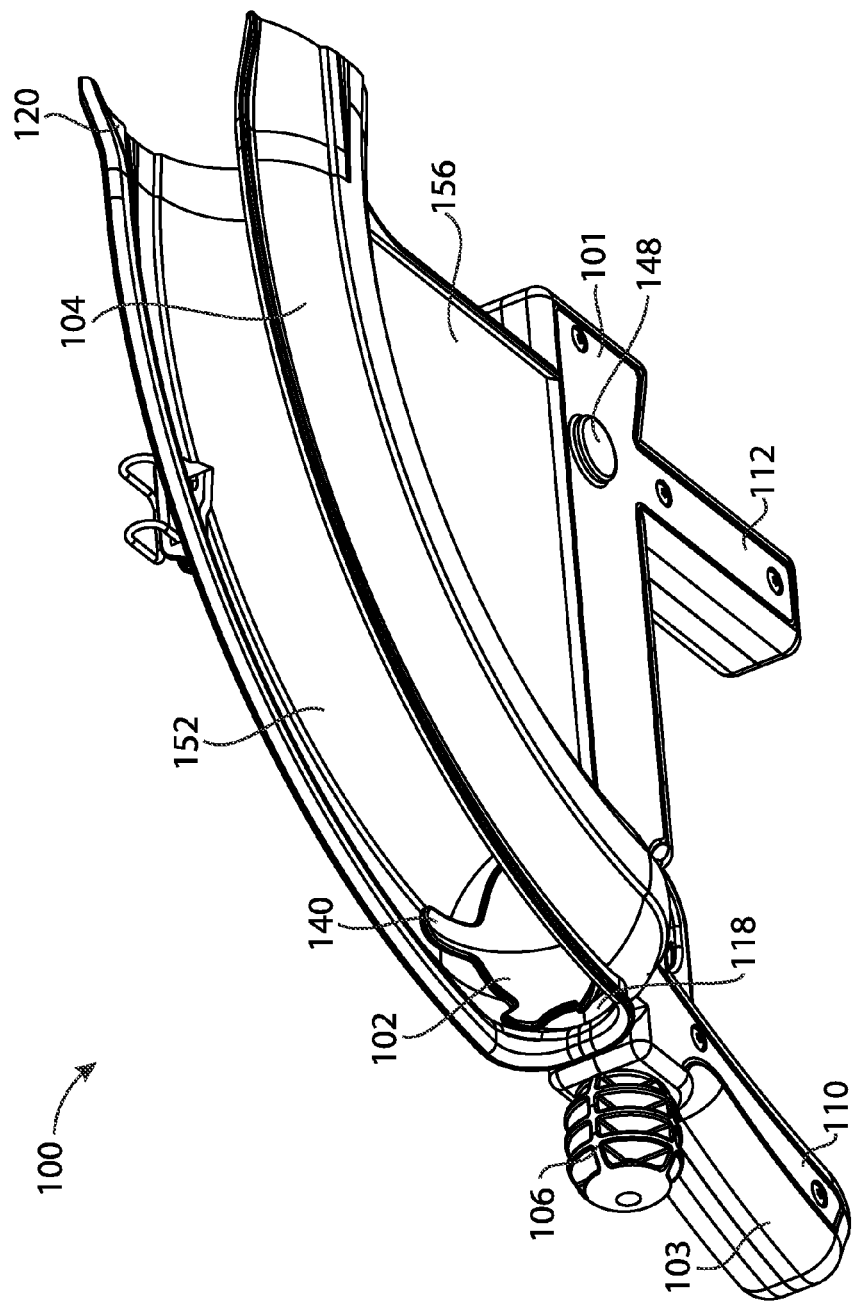
FIG. 10 is a perspective view of the throwing device of FIG. 1, wherein the throwing arm is in a cocked position.
Figure 11:
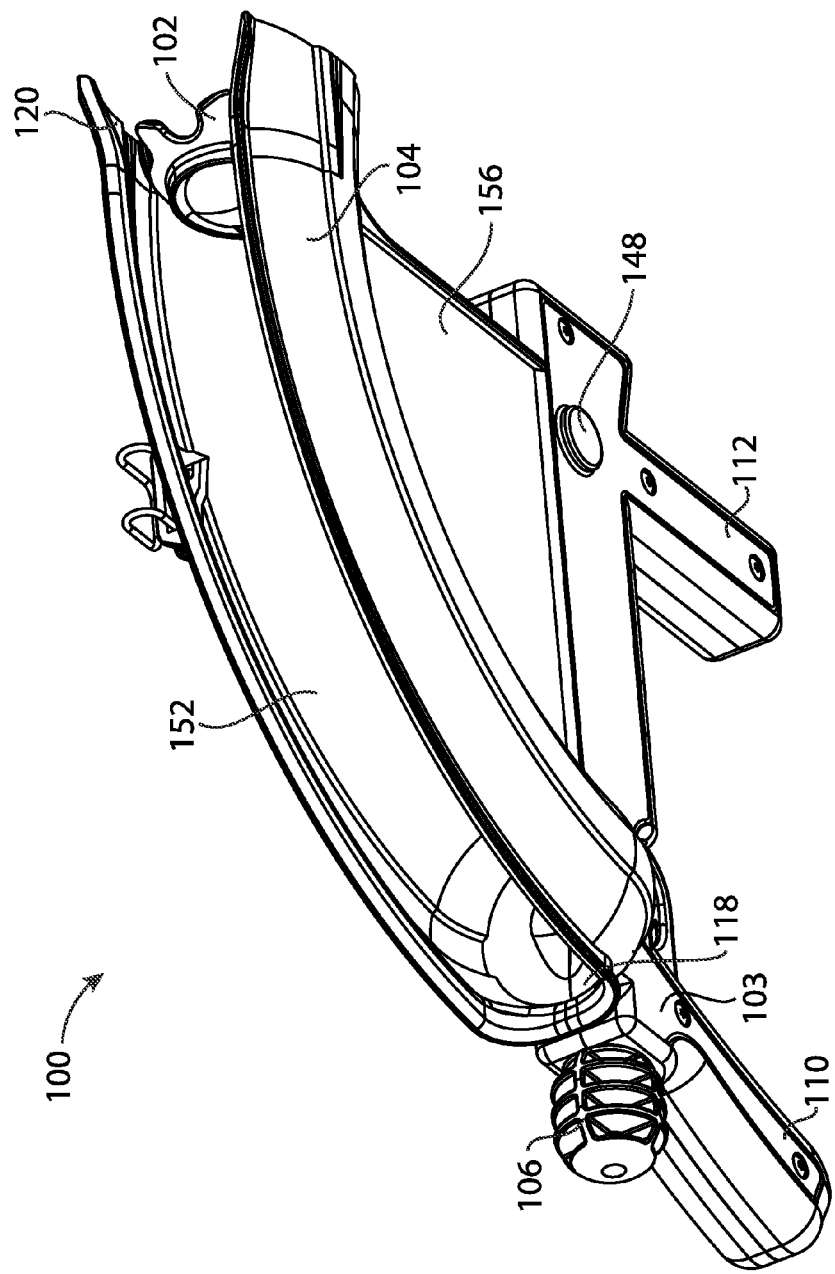
FIG. 11 is a perspective view of the throwing device of FIG. 1, wherein the throwing arm is in a throwing position.

Throwing arm 144 includes an engaging member 136 adapted to be received within notch 134 of trigger 108 when the throwing device 100 is cocked, e.g., as illustrated in FIGS. 3-5. Notch 134 receives engaging member 136 and retains throwing arm 144 in cocked position when the trigger 108 is in a forward position. Trigger spring 132 is adapted to push trigger 108 forward when at rest. When trigger 108 is pulled toward the rear 103 of the body 101 of the throwing device 100, engaging member 136 is released from notch 134.

Launching spring 126 actuates throwing arm 144 when engaging member 136 is released from notch 134. Launching spring 126 includes a forward portion 142 disposed toward the front 158 of the body of the throwing device adapted to be connected to the throwing arm 144 and a rear portion 128 adapted to be secured within, at, or near the rear 103 of the body 101 of the throwing device 100.

In the embodiment illustrated in FIGS. 1-11, spring 126 includes forward portion 142 ending in a hook 154 adapted to engage connection point 146 and attach launching spring 126 to throwing arm. A rear portion 128 of launching spring 126 is operatively attached to a tension adjustment member 106 via tension engagement member 130 and is thereby secured within the rear 103 of the body 101 of the throwing device 100.

Tension adjustment member 106 may allow a user to add tension to spring 126 by turning in a first direction and to release tension from spring 126 by turning in a second direction. Thus, tension adjustment member 106 may be used to adjust the distance an object launched by the throwing device will travel when launched.

Tension adjustment member 106 may include threads adapted to engage groves within a receiving member 105 disposed within body 101. In other embodiments, tension adjustment member may be adapted to be otherwise secured at a particular point of adjustment.

Figure 2:
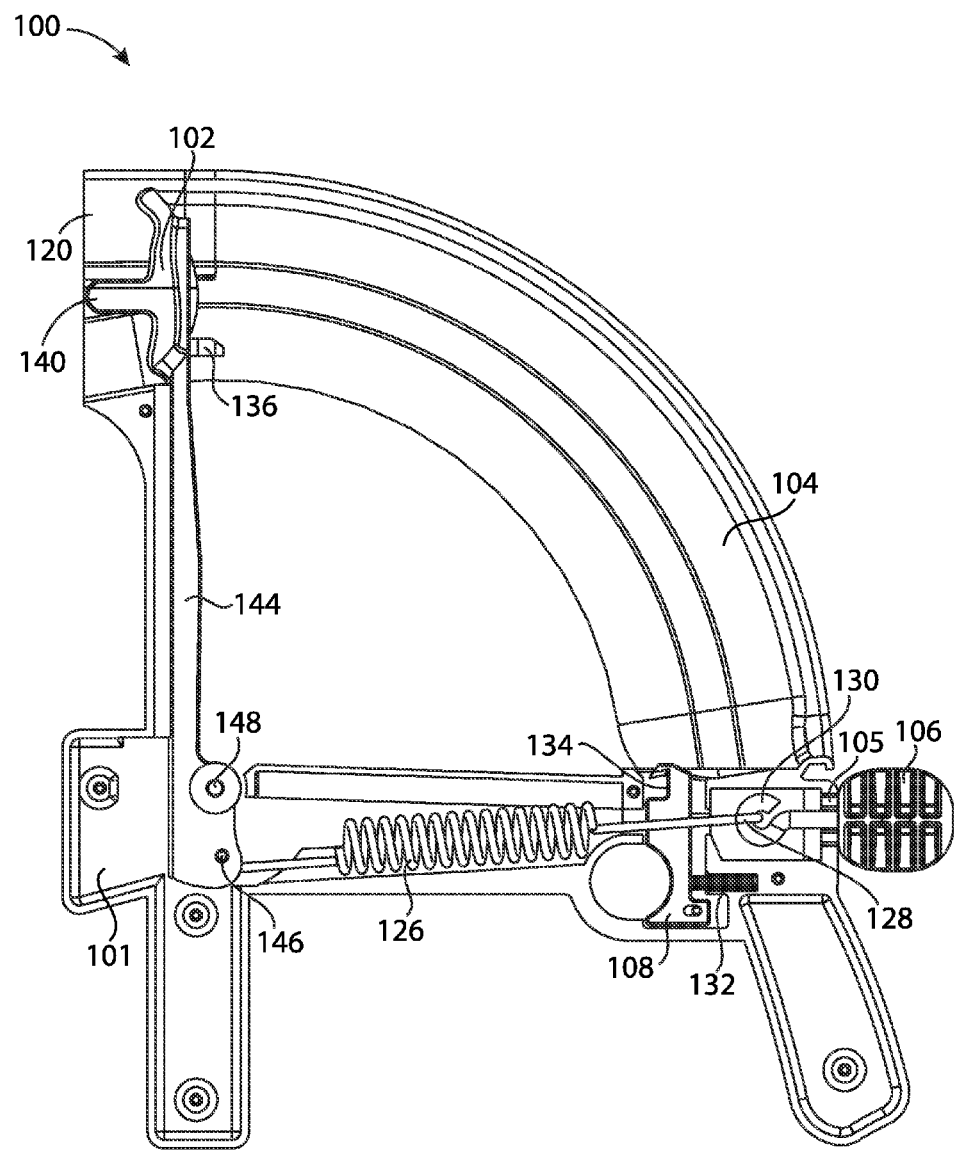
FIG. 2 is a left side, cutaway view of the throwing device of FIG. 1, wherein the throwing arm is in a throwing position.

The geometry of spring 126 and throwing arm 144 allow for cocking throwing device 100 with relative ease because a non-linear force acted upon throwing arm 144 is required to cock the throwing device 100. As a user pulls throwing arm 144 from the launched position (e.g., as illustrated in FIGS. 1 and 2) to the cocked position (e.g., as illustrated in FIGS. 3-5), the force required to cock throwing arm 144 will increase as spring 126 is loaded. However, as the user continues to pull throwing arm 144 past a break-over point toward the cocked position, the force required to cock the throwing device 100 will decrease. Thus, some embodiments of throwing devices of the disclosure may be used by persons who have difficulty throwing pet toys or other projectiles, such as users generally unable to throw due to injury or impairment of an arm or wrist, older users, and younger users.

Spring 126 is not attached to trigger 108. Therefore, trigger 108 may be pulled by force sufficient to compress trigger spring 132.

Shroud 104 partially encloses the cup member as it moves between the cocking end 118 and the launching end 120 of the throwing device 100. Shroud 104 includes a support portion 156 adapted to support the upper portion of the shroud 104 and to wholly or partially enclose handle 145 of throwing arm 144 as it moves between the cocking end 118 and the launching end 120 of the throwing device 100.

Opening 152 in shroud may allow a user to grab cup member 102 (e.g., at fingers 124, 125) and pull cup member 102 toward the cocking end and engage engaging member 136 within notch 134 of trigger 108 to cock the throwing device 100.

In an example embodiment, opening is between about ½ inch and about 2½ inches wide (e.g., about ½ inch, ¾ inch, 1 inch, 1¼ inches, 1½ inches, 1¾ inches, 2 inches, 2¼ inches, or 2½ inches). In one embodiment, opening 152 is about 1½ inches wide. In another embodiment, opening 152 is about 1¾ inches wide.

In the embodiment illustrated in FIGS. 1-11, fingers 124, 125 are just below the top of shroud 104 and, therefore, cup member 102 is entirely contained within shroud 104. In other embodiments, fingers or a portion of cup member may extend beyond the top of a shroud. In such an embodiment, it may be easier for a user to grip the cup member (or its fingers) to pull a throwing arm into a cocked position. In one embodiment, at least one finger extends about ⅝ inch above the top of the shroud.

The enclosed portion of shroud 104 (including the support portion 156) is generally hollow to permit the throwing arm 144 and cup member 102 to move freely along the throwing arm path 116.

Shroud 104 may protect a user or other nearby persons, animals, or objects from being hit by the throwing arm as it moves forward, actuated by the spring. Shroud 104 may also minimize the risk of pinching between throwing arm 144 and body 101 when throwing arm 144 is moved into a cocked position.

Shroud 104 may be provided as an integral part of body 101. For example, in some embodiments, right and left sides of a shroud, support portion, and body are formed as a single unit and attached to one another during the process of manufacturing a throwing device of the disclosure. In other embodiments, a shroud may be formed as one or more separate pieces and attached to body. In some such embodiments, shroud may be more or less permanently attached to body. In other such embodiments, shroud may be removably attached, such that it may be removed and reattached by a user.

Stop 182 may be formed of a pliable material (e.g., silicone rubber) and may dissipate force of throwing arm 144 applied by its forward movement.

The embodiment of FIGS. 1-11 further includes clip 114 that may be used, for example, to hook throwing device onto an item of clothing (such as a belt) or in a position to be conveniently retrieved for use (such as on a hook secured within a wall or post).

Other embodiments of throwing devices 200, 400, 500, 600, 700 of the invention are illustrated in FIGS. 12-27 and are described below. Some features one or more of throwing devices 100, 200, 400, 500, 600, 700 are common to one another and, accordingly, descriptions of such features in one embodiment should be understood to apply to other embodiments. Furthermore, particular characteristics and aspects of one embodiment may be used in combination with, or instead of, particular characteristics and aspects of another embodiment.

FIGS. 12-16 illustrate another embodiment of a throwing device 200 of the invention. Throwing device 200 is similar to throwing device 100 in several respects and includes body 201, front grip 212, rear grip 210, shroud 204 and support portion 256. Throwing arm 244 is attached to the body 201 of throwing device 200. Cup member 202 is at the end of handle 245 of throwing arm 244 and is adapted to receive an object (such as ball 238). Throwing arm 244 moves about pivot point 248 between cocking end 218 and the launching end 220.

Launching spring 226 actuates throwing arm 244 and includes front portion 242 terminating in hook 254 adapted to be attached to throwing arm 244 at connection point 246.

Figure 12:
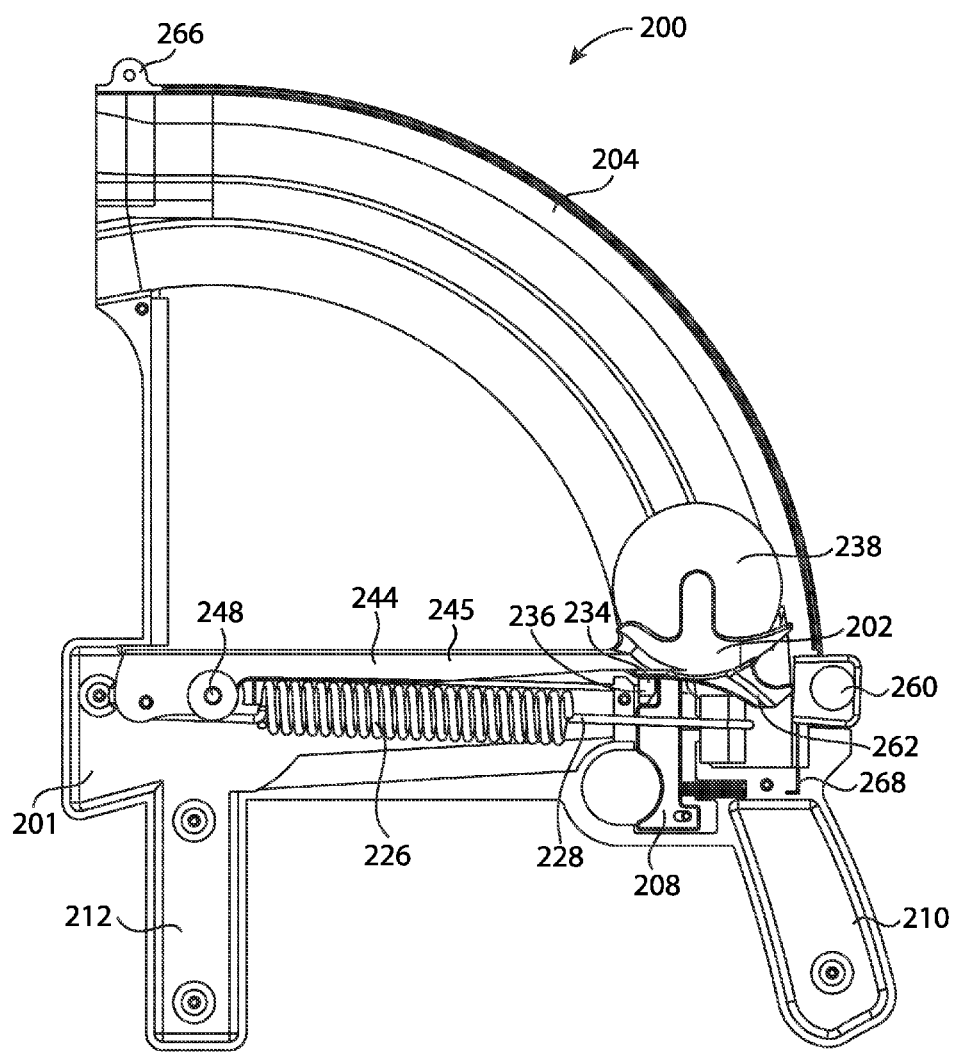
FIG. 12 is a left side, cutaway view of a throwing device, according to another example embodiment.
Figure 13:
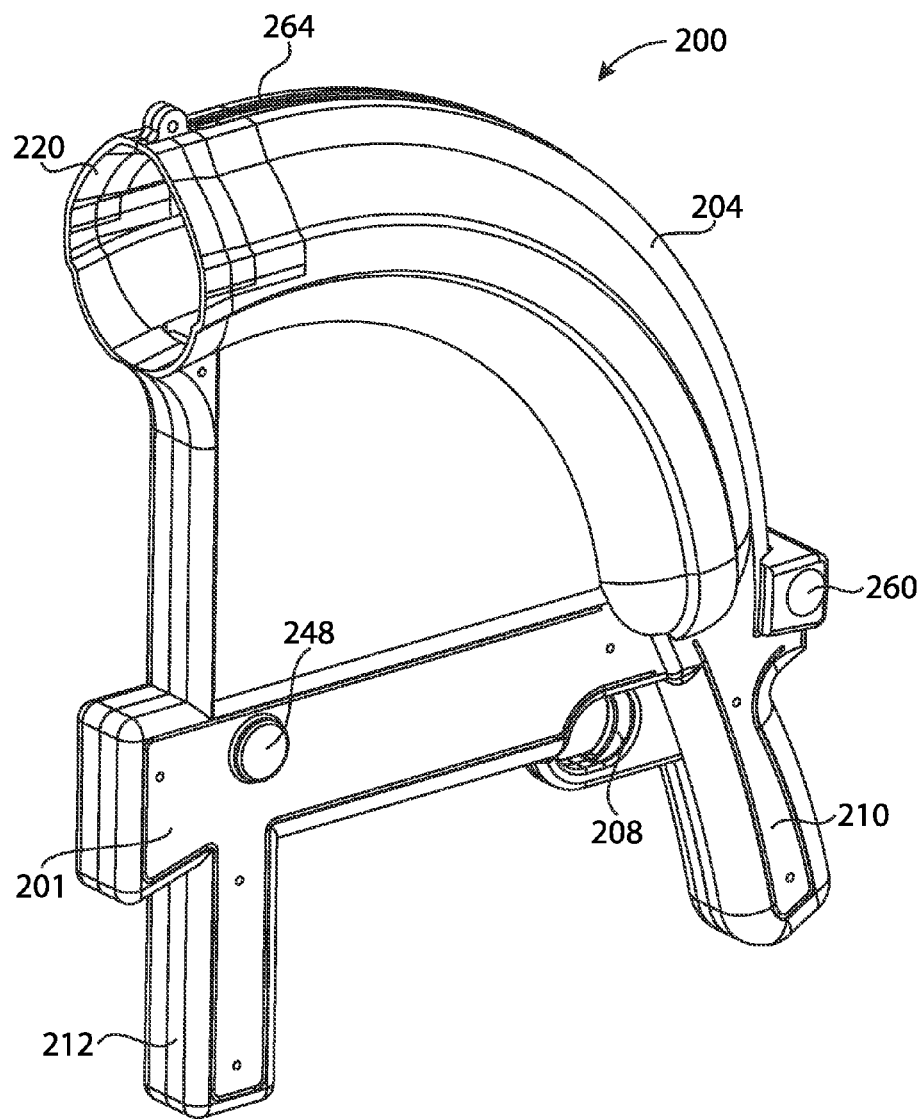
FIGS. 13 and 14 are perspective views of the throwing device of FIG. 12.
Figure 14:
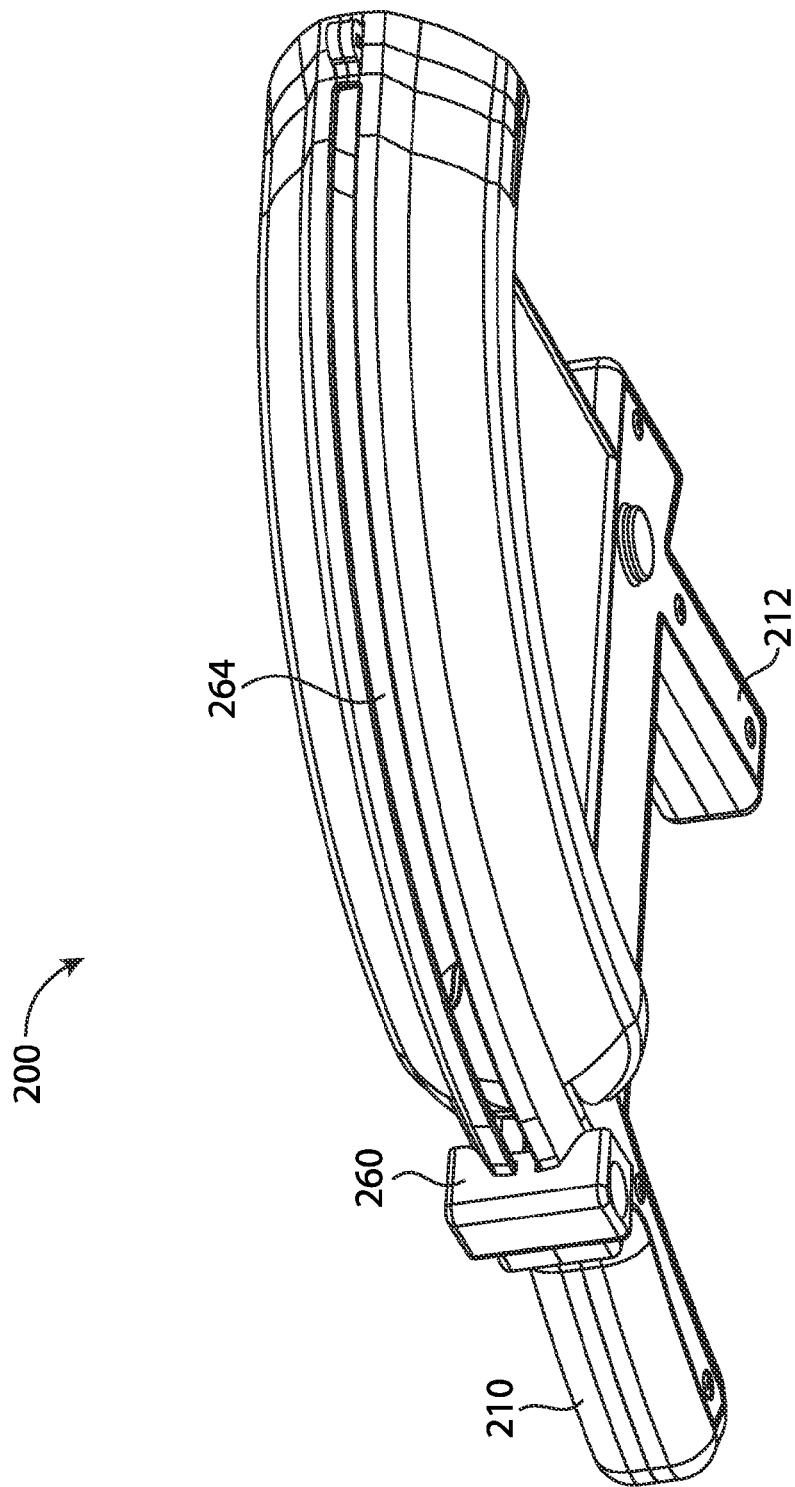
Figure 15:
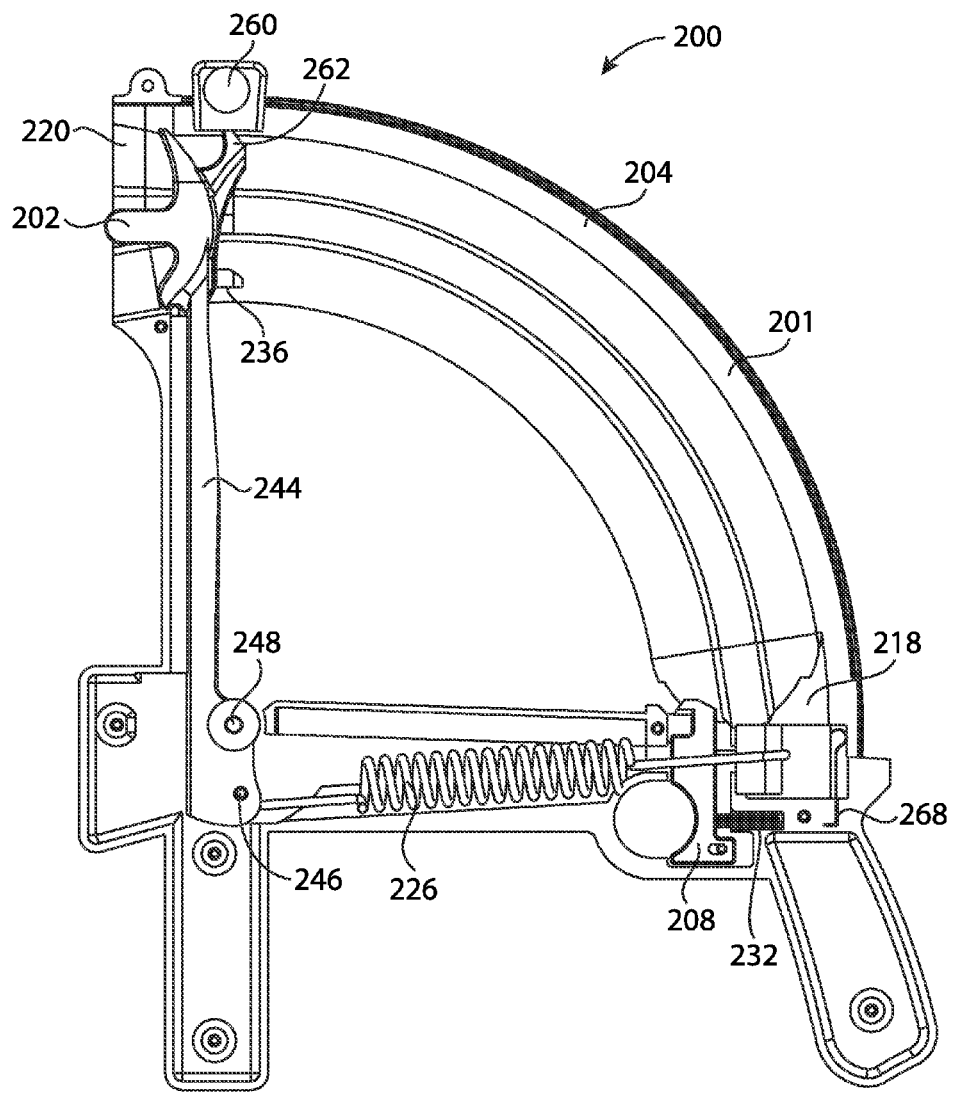
FIG. 15 is a left side, cutaway view of the throwing device of FIG. 12.
Figure 16:
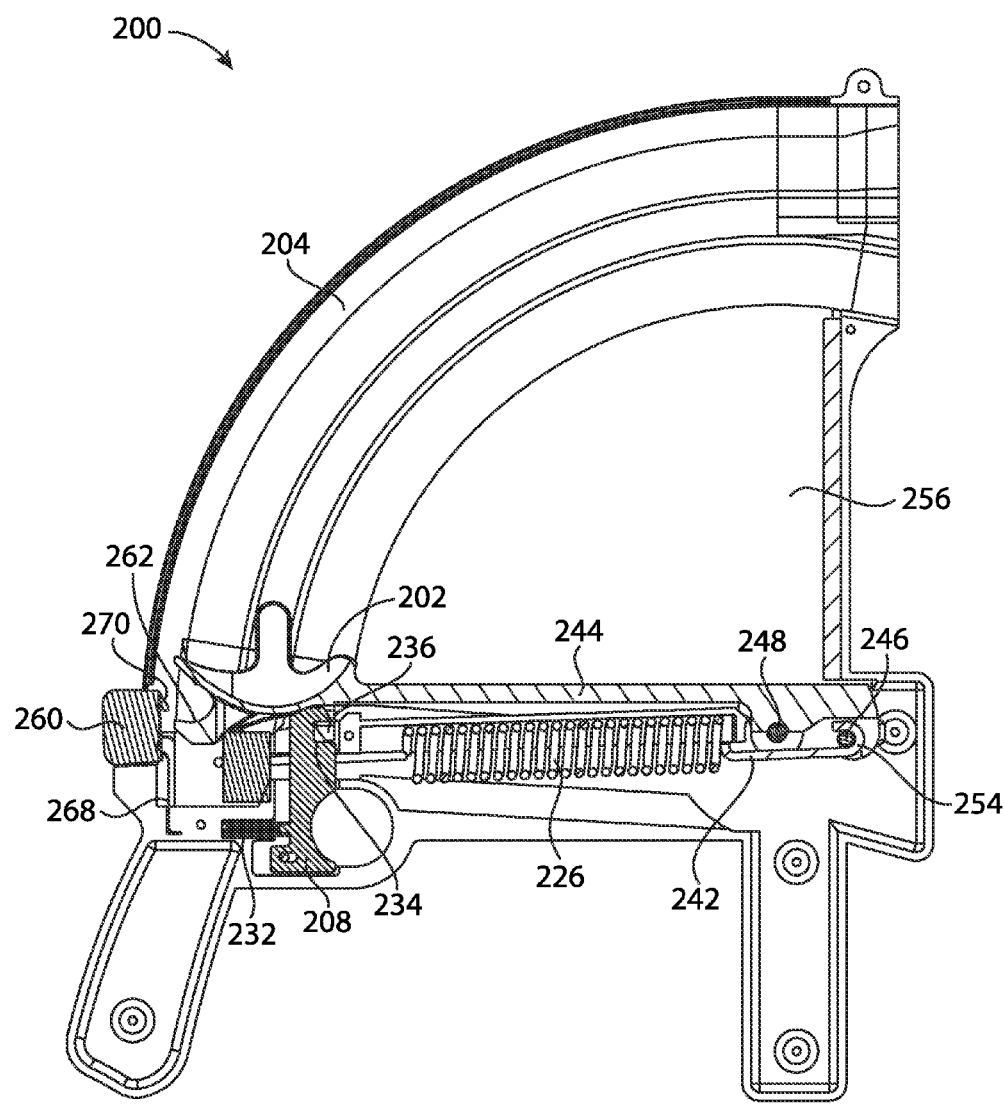
FIG. 16 is a right side, section view of the throwing device of FIG. 12.

Engaging member 236 is adapted to be received within notch 234 of trigger 208 when throwing device 200 is cocked (e.g., as shown in FIGS. 12 and 16) and to be released when trigger 208 is pulled toward the rear of throwing device, applying compressive force to trigger spring 232.

Throwing device 200 does not include a tension adjustment member (although, in other embodiments, a throwing device with features of throwing device 200 further includes a tension adjustment member). Instead, a rear portion 228 of spring 226 is secured within the body 201 of throwing device 200.

Slide 260 includes slide engaging member 270. Engaging member 270 of slide is adapted to engage hook member 262 of throwing arm 244, thereby allowing a user to move throwing arm 244 from throwing end 220 toward cocking end 218 by moving slide along groove 264 in shroud 204. As illustrated in FIG. 16, after engaging member 236 is received within notch 234 of trigger (and throwing device 200 is thereby cocked), slide spring 268 pushes slide 260 rearward, disengaging slide engaging member 270 from hook member 262 of slide 270.

After throwing arm 244 has been released (e.g., after trigger 208 has been pulled), a user may pull slide 260 forward along groove 264 to re-engage hook member 262 of throwing arm 244 with slide engaging member 262 of slide 270.

Sight 266 may be used by a user to align throwing device 200 with a particular target.

Figure 17:
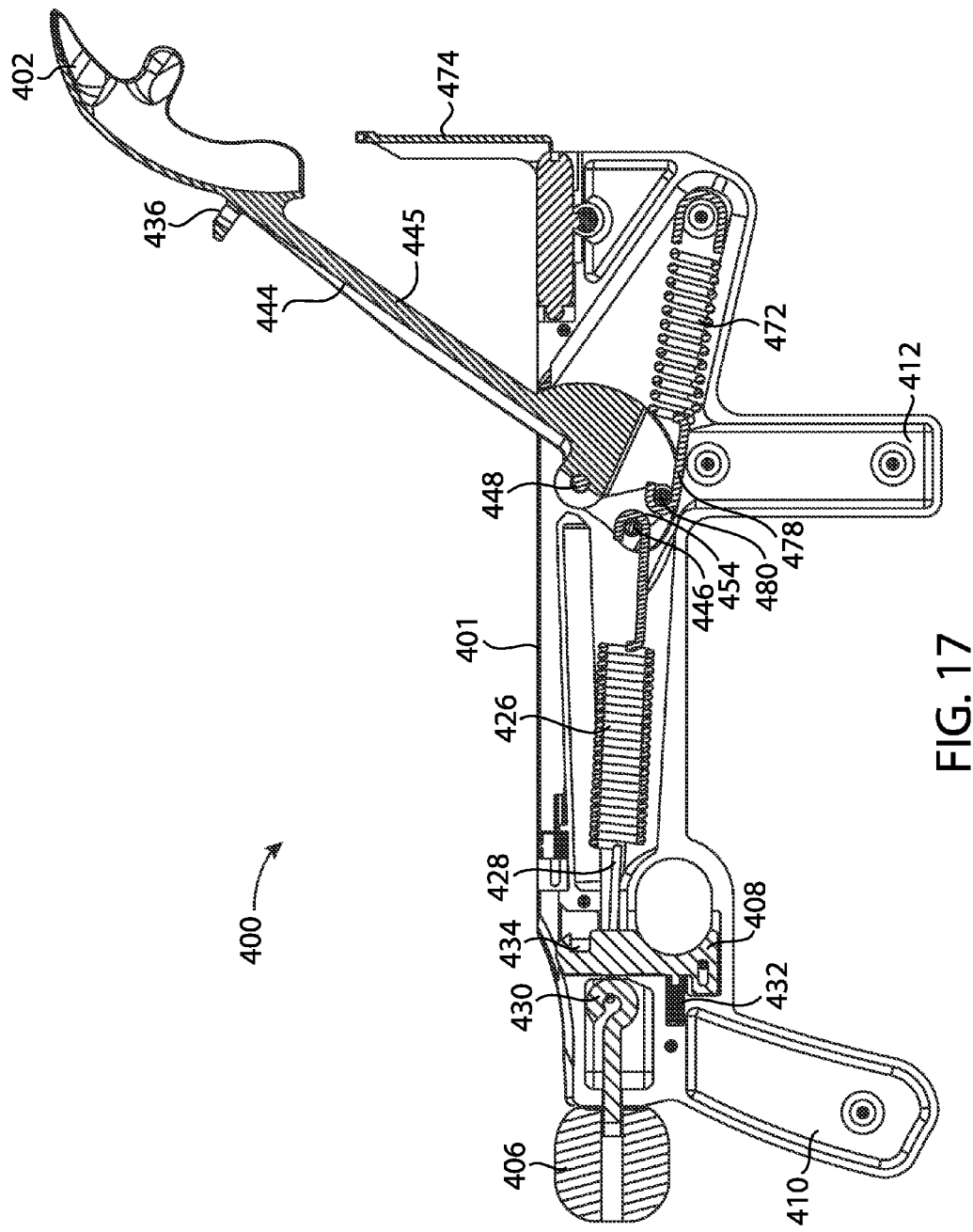
FIG. 17 is a right side, section view of a throwing device, according to yet another embodiment.
Figure 18:
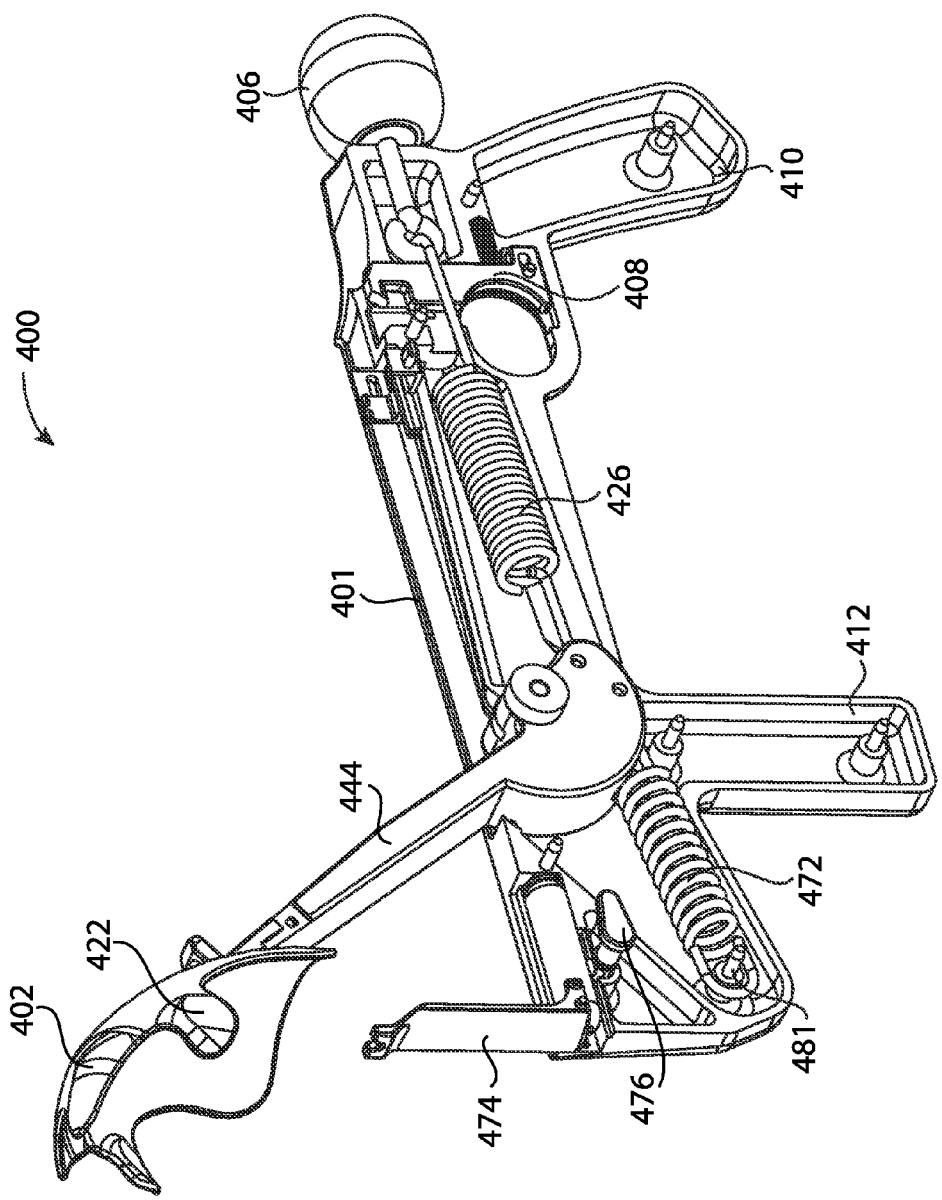
FIG. 18 is a perspective, cutaway view of the throwing device of FIG. 17.
Figure 19:
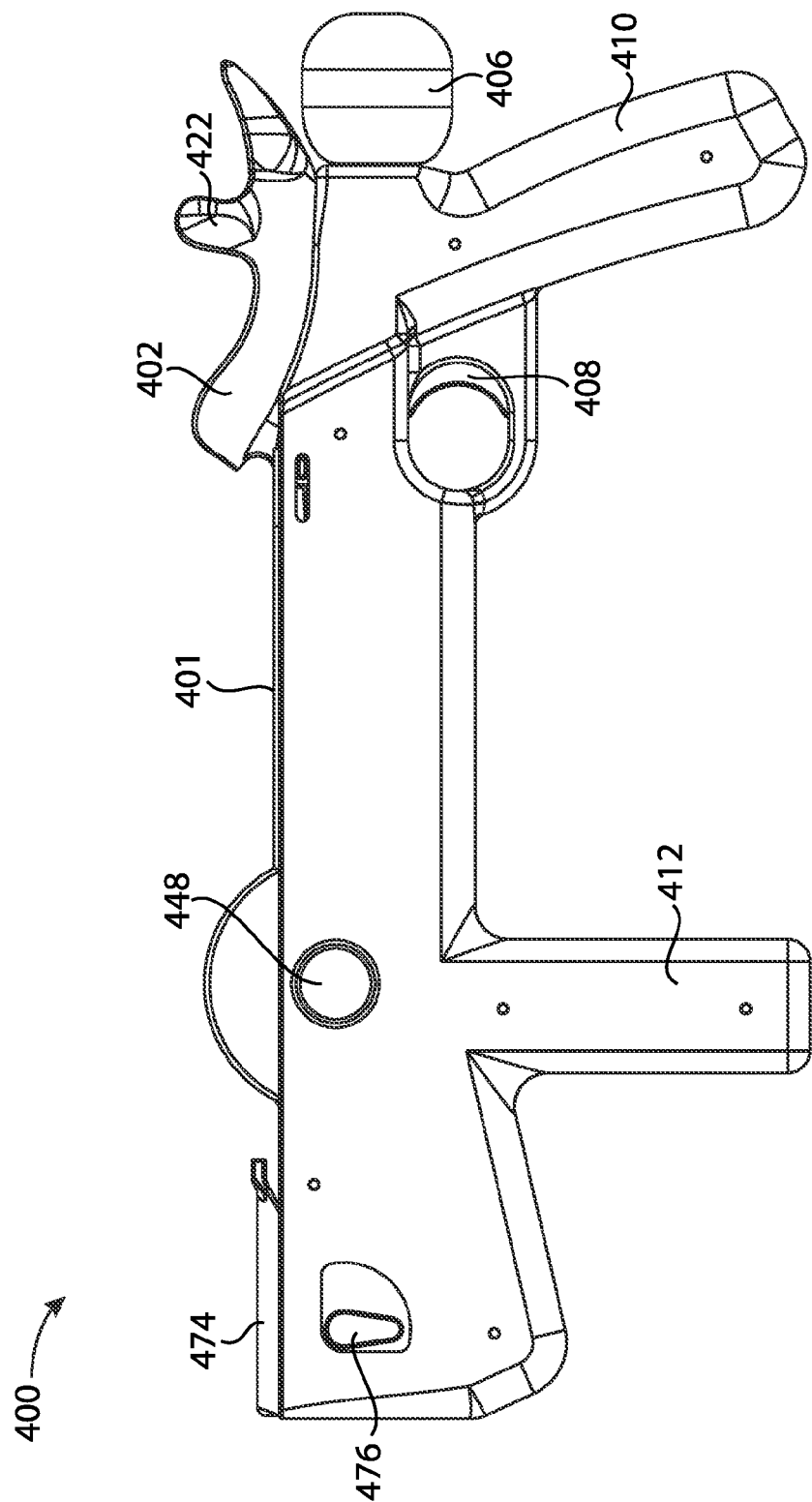
FIG. 19 is a left side view of the throwing device of FIG. 17.

FIGS. 17-19 illustrate another embodiment of a throwing device 400 of the invention. Throwing device 400 includes body 401, front grip 412, rear grip 410, and throwing arm 444. Throwing arm 144 includes handle 145 and cup member 402 disposed at the end of handle 145. Cup member 402 includes fingers 422 adapted to hold an object to be launched from cup member 402. Cup member 402 further includes engaging member 436 adapted to be received within notch 434 of trigger 408 when throwing device 400 is cocked (e.g., as shown in FIG. 19) and to be released when trigger 408 is pulled toward the rear of throwing device 400, applying compressive force to trigger spring 432.

Launching spring 426, on one end, terminates in hook 454 adapted to be attached to throwing arm 444 at connection point 446. On the rear end, launching spring 426 includes rear portion 428 adapted to be received by tension engagement member 430 of tension adjustment member 406.

Throwing arm 444 moves about pivot point 448 as it moves between a cocked position (e.g., as shown in FIG. 19) to a fired position (e.g., as shown in FIGS. 17 and 18).

Secondary spring 472 is adapted to moderate the forward movement of throwing arm 444 after it is released from trigger 408. Rear portion 478 of secondary spring 472 is attached to throwing arm 444 at connection point 480. Secondary spring 472 is secured within the front of body 401 at connection point 481. The forward motion of throwing arm 444 will apply tension to secondary spring 472; secondary spring 472 may thereby operate to slow or otherwise moderate the forward movement of throwing arm 444.

Sight 474 may be raised and lowered by lever 476, and may be used by a user to align throwing device 400 with a particular target.

Switch 476 may be used to operate a light in body 401 of throwing device 400.

Figure 20:
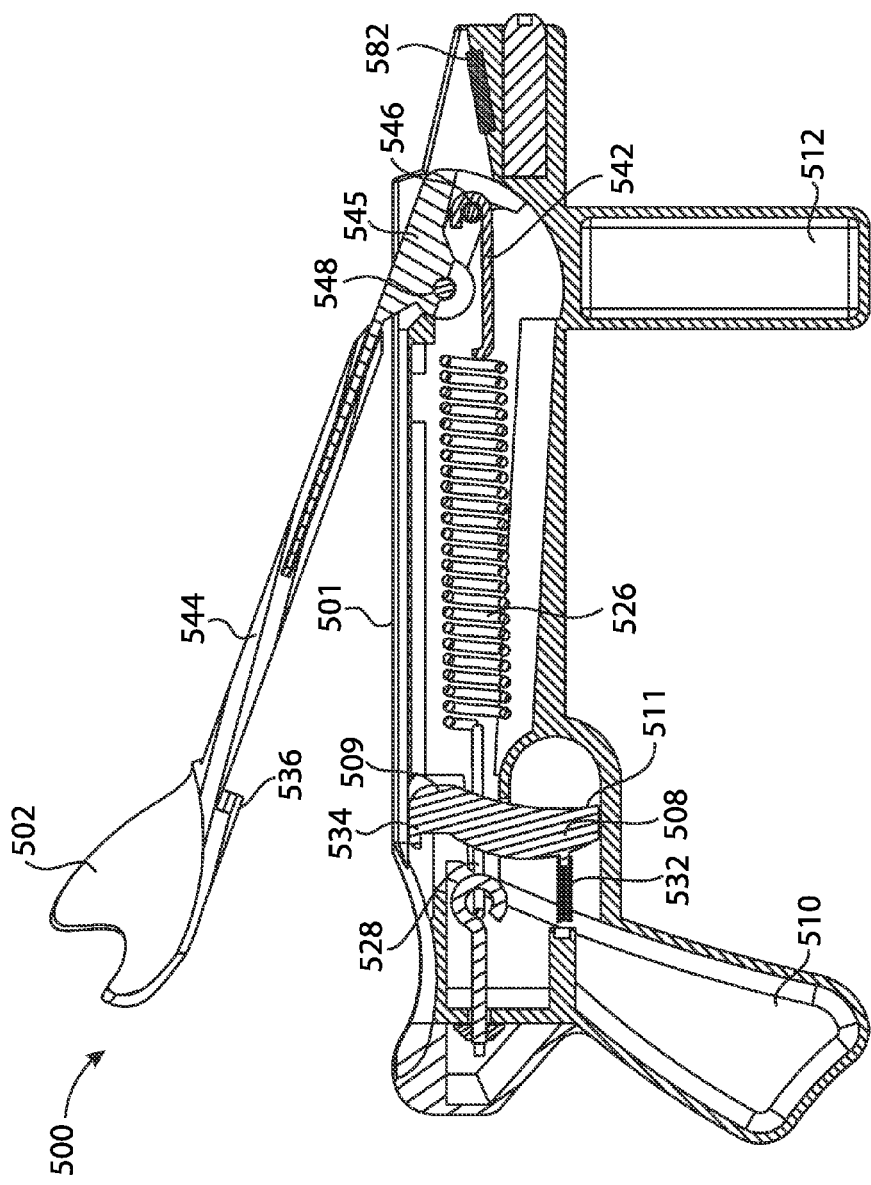
FIG. 20 is a right side, section view of a throwing device, according to a further example embodiment.
Figure 21:
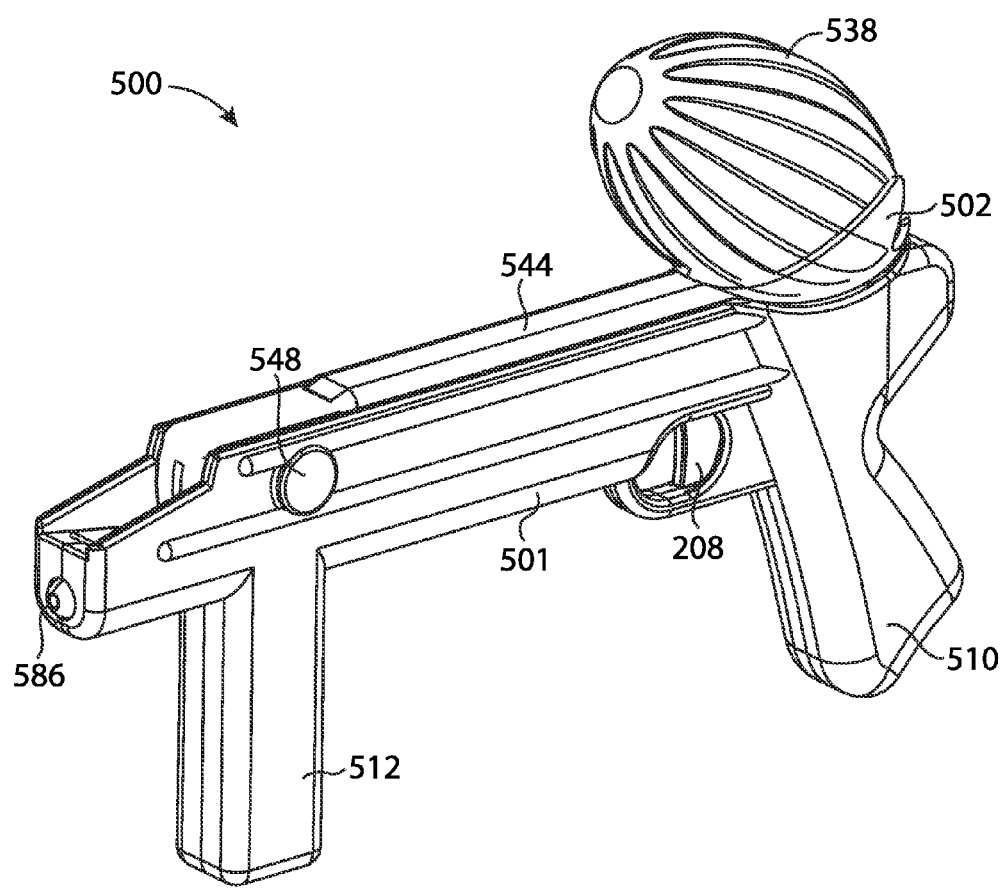
FIG. 21 is a perspective view of the throwing device of FIG. 20.

Yet another embodiment of a throwing device 500 of the invention is illustrated in FIGS. 20 and 21. Throwing device 500 includes body 501, front grip 512, rear grip 510 and throwing arm 544. Throwing arm 544 includes handle 545 with cup member 502 disposed at the end thereof. Cup member 502 is adapted to receive an object (such as football 538) to be launched by throwing device 500.

Cup member 502 further includes engaging member 536 adapted to be engaged by trigger engaging member 534 of trigger 508 when throwing device 500 is cocked (e.g., as shown in FIG. 21).

Trigger 508 is adapted to pivot when pulled, causing upper portion 509 of trigger to move forward, releasing engaging member 536 from trigger engaging member 534, and allowing launching spring 526 to actuate throwing arm 544 about pivot point 548. When at rest, trigger spring 532 pushes the lower portion 511 of trigger 508 forward.

The front end 542 of launching spring 526 is adapted to be attached to throwing arm 544 at connection point 546. On the rear end, launching spring 526 includes rear portion 528 adapted to be secured within the rear portion of body 501 of throwing device 500.

Stop 582 may be formed of a pliable material (e.g., silicone rubber) and may dissipate force of throwing arm 544 applied by its forward movement.

Light feature 586 may include a light source, such as a laser or LED. Light feature may be used in aligning throwing device with a particular target or in connection with a particular game of throw and catch, e.g., to engage the attention of a dog.

Figure 22:
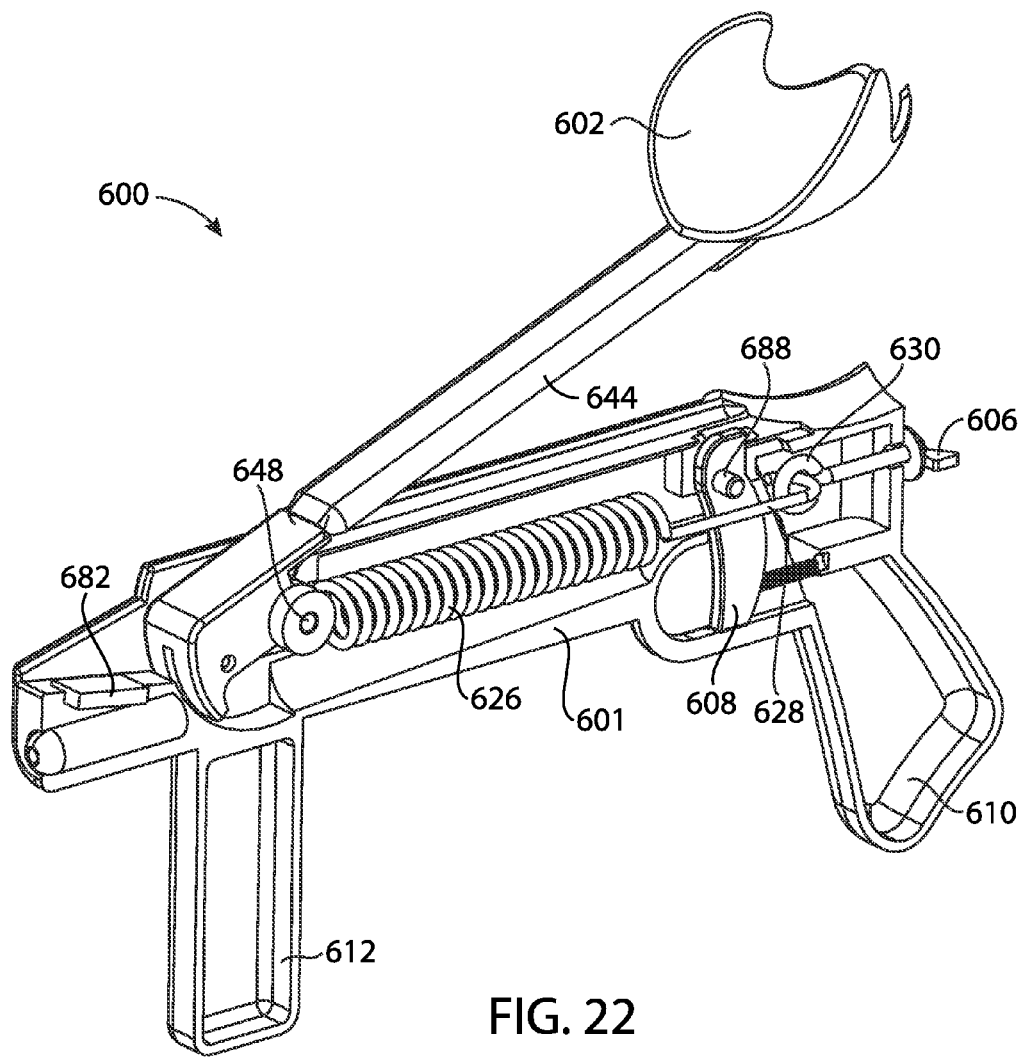
FIG. 22 is a perspective, cutaway view of a throwing device, according to yet another example embodiment.
Figure 23:
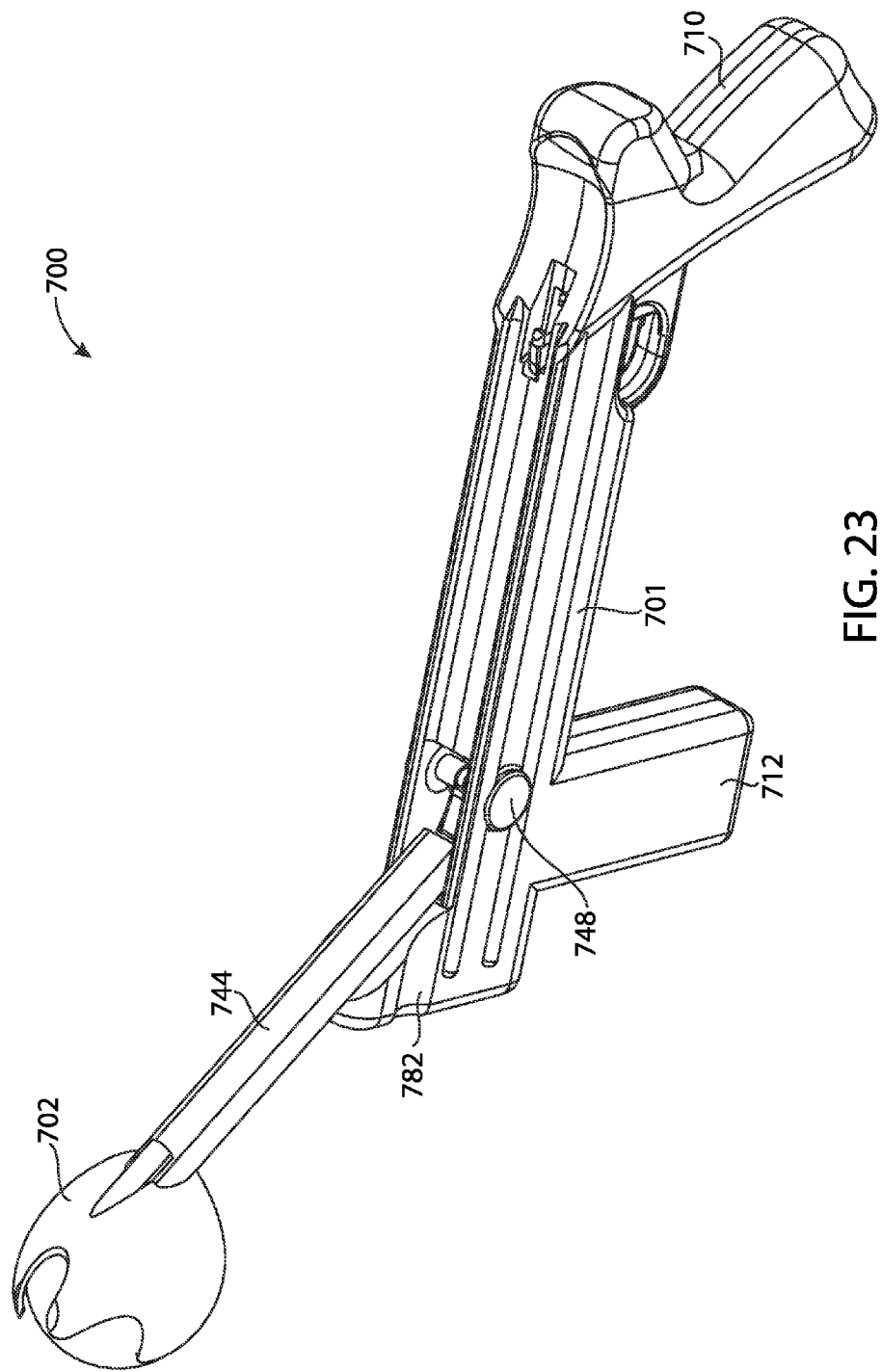
FIG. 23 is a perspective view of a throwing device, according to a further example embodiment.
Figure 24:
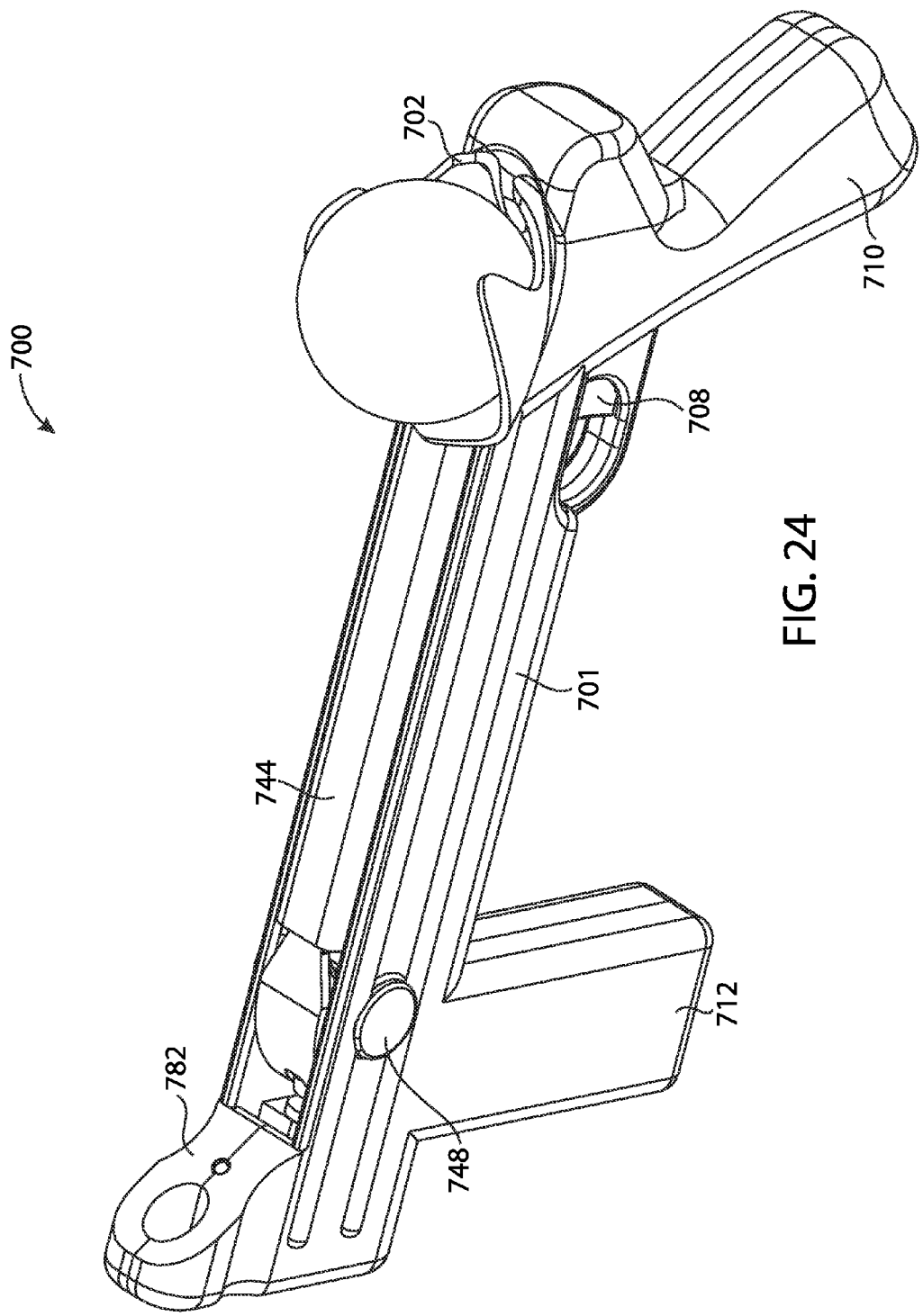
FIG. 24 is a perspective view of the throwing device of FIG. 23, wherein the throwing arm is in a cocked position.
Figure 25:
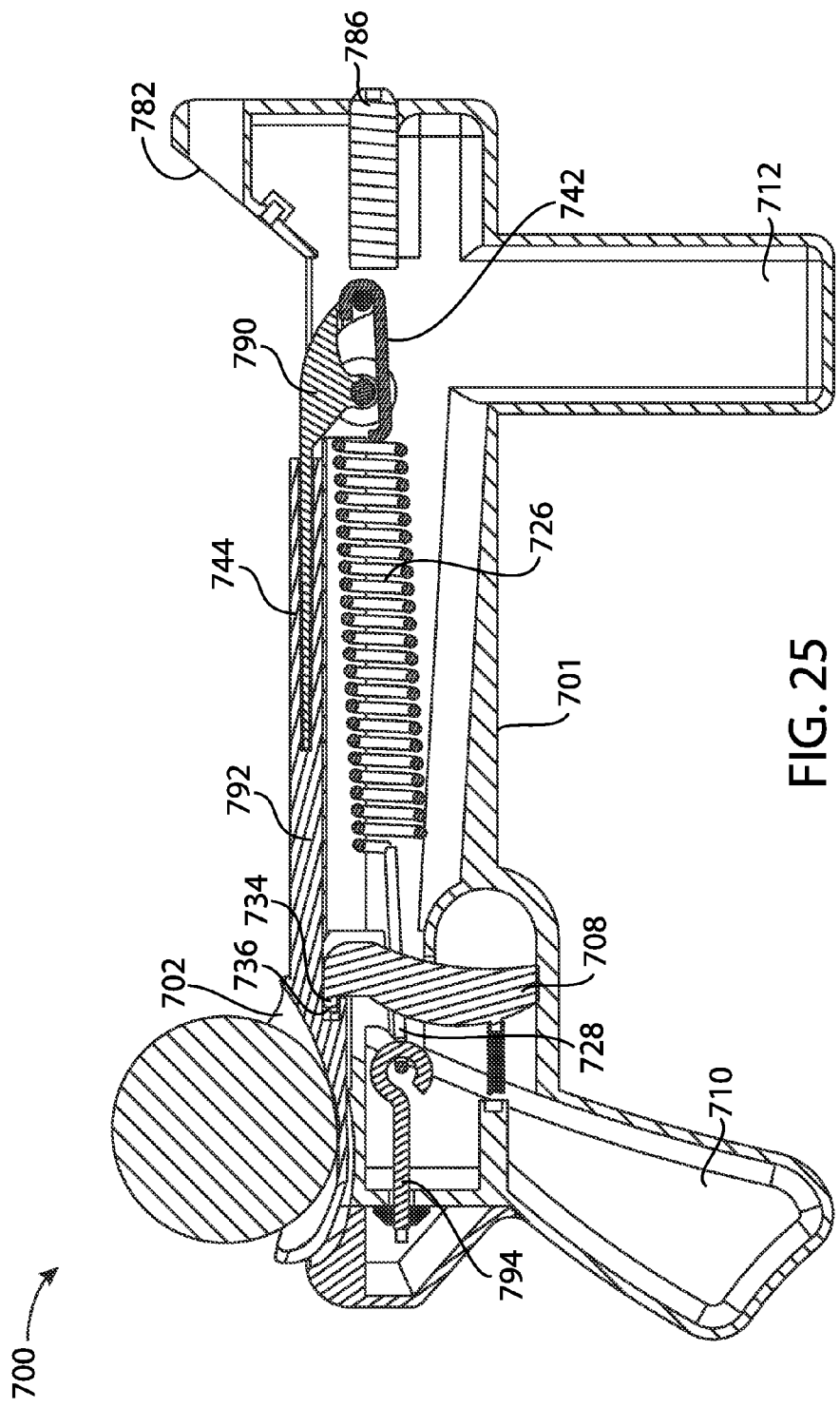
FIG. 25 is a right side, section view of the throwing device of FIG. 23, wherein the throwing arm is in a cocked position.
Figure 26:
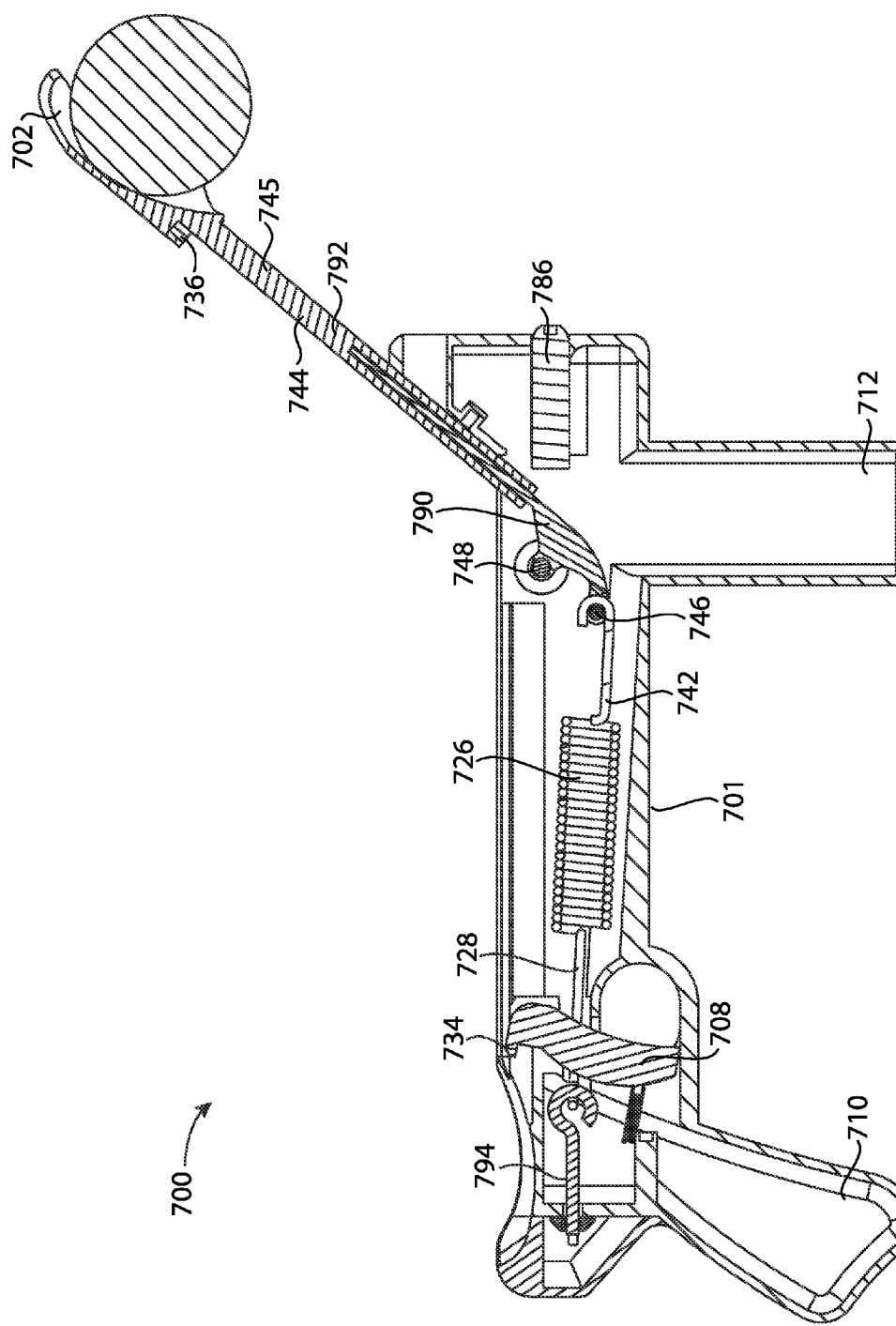
FIG. 26 is a right side, section view of the throwing device of FIG. 23, wherein the throwing arm is in a throwing position.
Figure 27A:
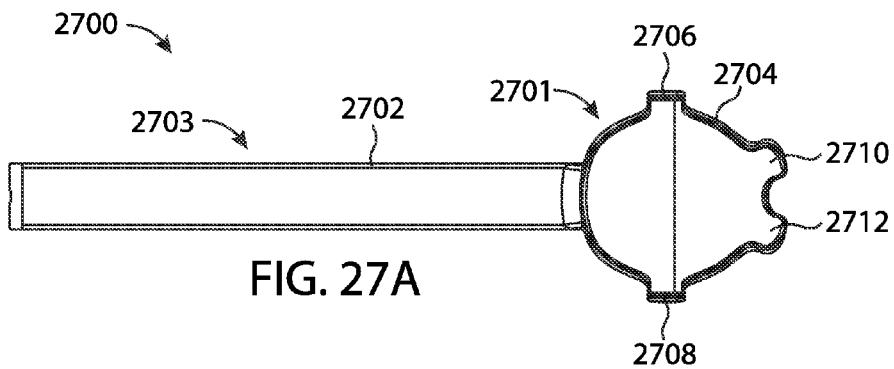
FIG. 27A is a top view of a throwing arm of a throwing device, according to an example embodiment.
Figure 27B:
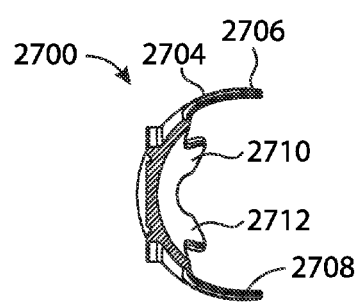
FIG. 27B is a vertical section view of the throwing arm of FIG. 27A.
Figure 27C:
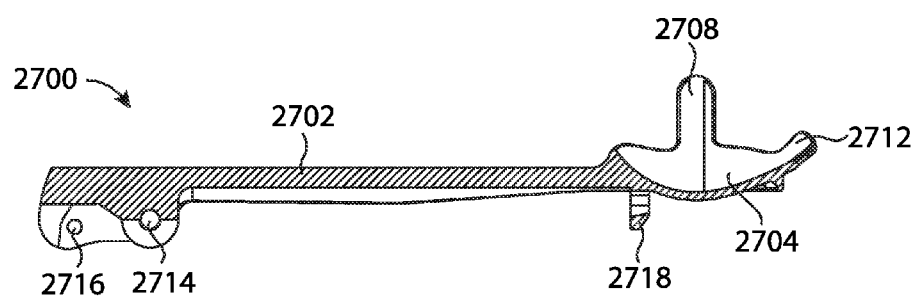
FIG. 27C is a horizontal section view of the throwing arm of FIG. 27A.
Figure 27D:
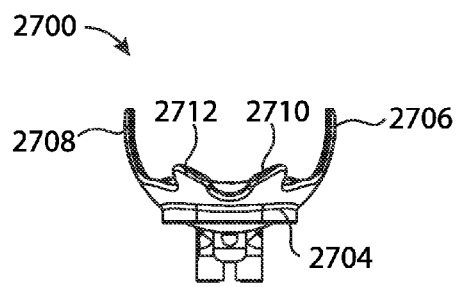
FIG. 27D is a first end view of the throwing arm of FIG. 27A.
Figure 27F:
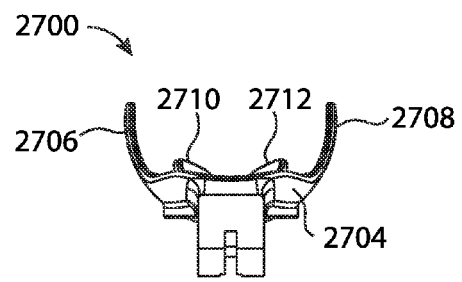
FIG. 27F is a second end view of the throwing arm of FIG. 27A.
Figure 27E:
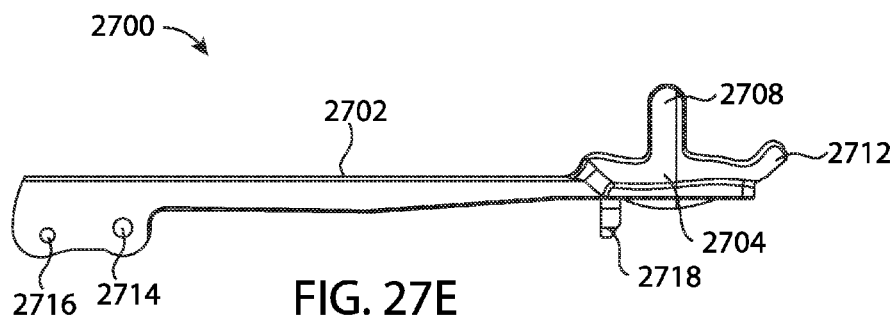
FIG. 27E is a side view of the throwing arm of FIG. 27A.
Figure 27G:
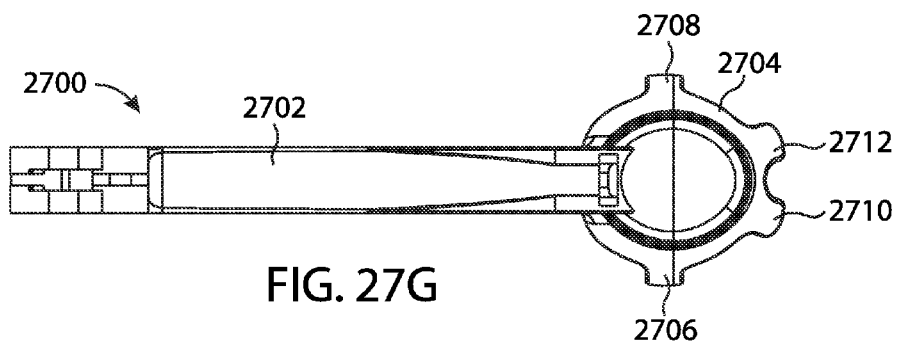
FIG. 27G is a bottom view of the throwing arm of FIG. 27A.
Figure 28A:
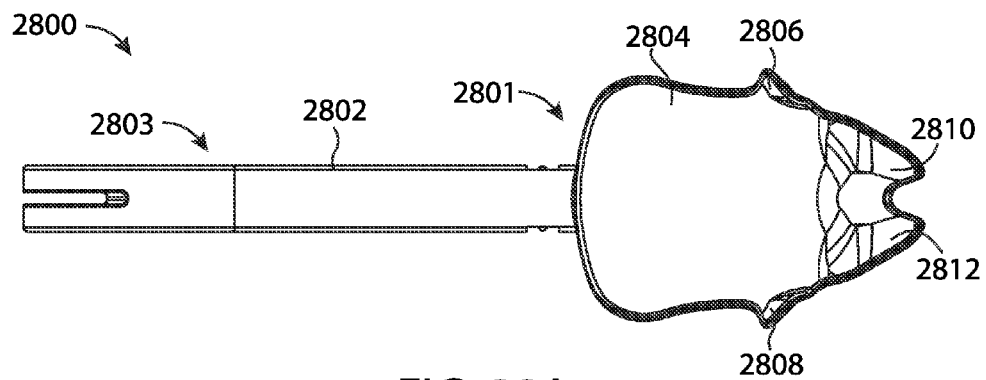
FIG. 28A is a top view of a throwing arm of a throwing device, according to another example embodiment.
Figure 28B:
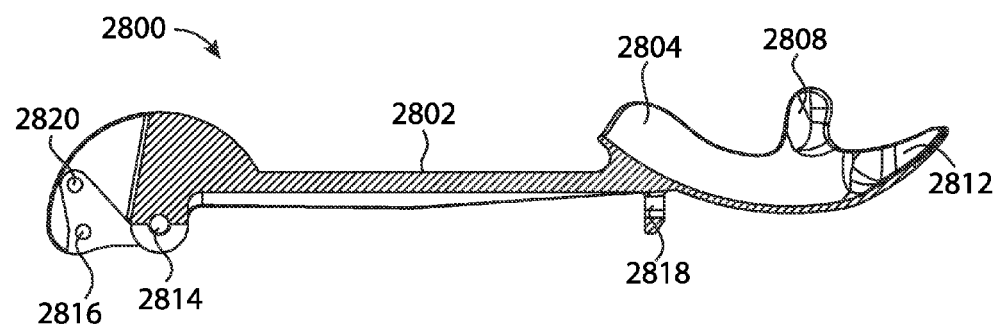
FIG. 28B is a horizontal section view of the throwing arm of FIG. 28A.
Figure 28C:
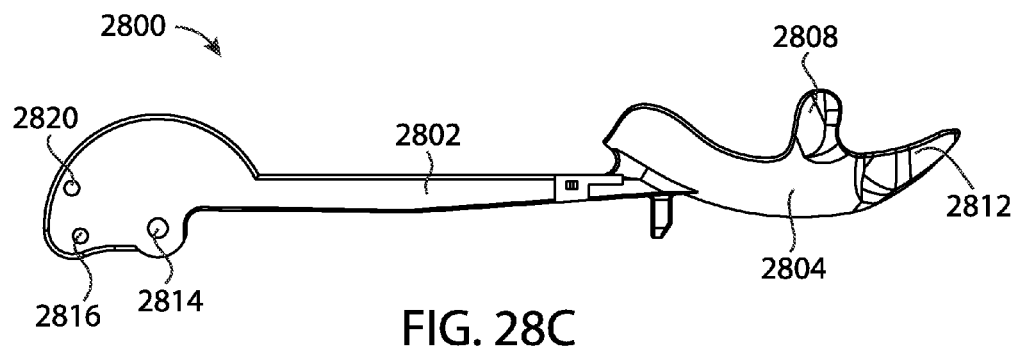
FIG. 28C is a side view of the throwing arm of FIG. 28A.
Figure 28D:
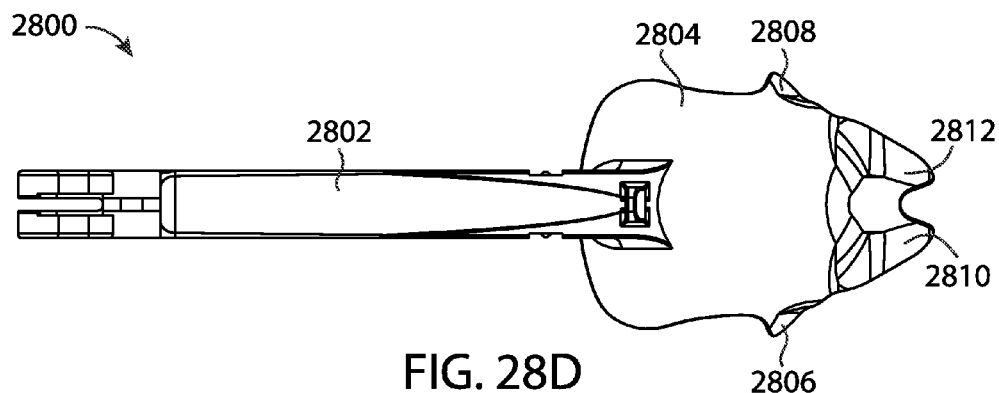
FIG. 28D is a bottom view of the throwing arm of FIG. 28A.
Figure 28E:
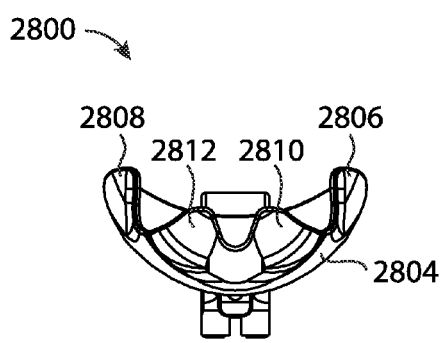
FIG. 28E is a first end view of the throwing arm of FIG. 28A.

The embodiment of a throwing device 600, as illustrated in FIG. 22, is similar to throwing device 500. Throwing device 600 includes body 601, front grip 612, rear grip 610, throwing arm 644 with cup member 602 disposed at the end thereof.

Trigger 608 is adapted to pivot about pivot point 688 when pulled, releasing throwing arm 644 and allowing launching spring 626 to actuate throwing arm 644 about pivot point 648. Throwing device 600 includes a tension adjustment member 606 adapted to be connected to a rear portion 628 of launching spring 626 via tension engagement member 630.

Stop 682 may be formed of a pliable material (e.g., silicone rubber) and may dissipate force of throwing arm 644 applied by its forward movement.

FIGS. 22-26 illustrate yet another embodiment of a throwing device 700 of the invention. Throwing device 700 includes a body 701, a front grip 712, and a rear grip 710.

Throwing arm 744 of throwing device 700 includes a handle 745 and a cup portion 702. Handle is formed from first portion 790 attached to body 701 of throwing device 700 and a lower end of second portion 792 adapted to be releasably attached to the first portion 790. Cup member 702 is formed as part of the upper end of second portion 792. Thus, throwing device 700 may be provided with a plurality of second portions 792 of throwing arms 744, each of which is provided with a different cup member 702 adapted to hold a different size or shape of object. For example, first portion 790 of throwing arm 744 may be slid into an aperture of second portion 792 of throwing arm 744. First portion 790 may be otherwise attached to second portion 792.

Trigger 708 is adapted to pivot when pulled, causing upper portion of trigger to move forward, releasing engaging member 736 of throwing arm 744 from trigger engaging member 734 of trigger 708, and allowing launching spring 726 to actuate throwing arm 744 about pivot point 748.

The front end 742 of launching spring 726 is adapted to be attached to throwing arm 744 at connection point 746. On the rear end, launching spring 726 includes rear portion 728 adapted to be secured within the rear portion of body 701 of throwing device 700 by spring attachment member 794.

Stop 782 may stop the forward movement of throwing arm 744.

Light feature 786 may include a light source, such as a laser or LED. Light feature may be used in aligning throwing device with a particular target or in connection with a particular game of throw and catch, e.g., to engage the attention of a dog.

FIGS. 27A-27G illustrate a throwing arm 2700 according to an example embodiment. Throwing arm 2700 may be deployed in a throwing device of one or more of FIGS. 1-26 or may be deployed in other embodiments of throwing devices.

Throwing arm 2700 includes handle 2702 and cup member 2704. Cup member includes fingers 2708, 2706 extending upward from a first side edge and second side edge, respectively, of cup member 2704 and are disposed toward the middle of cup member 2704. Fingers 2708, 2706 curve inward toward the center of cup member 2704 and thus will grip a properly-sized object placed within cup member 2704.

In some embodiments, fingers near the center of a cup member may flare slightly, e.g., toward the top or base of the cup member.

Fingers 2710, 2712 extend upward from an upper edge of cup member 2704. Fingers 2710, 2712 may help secure some objects placed within cup member 2704, such as a football. The gap between fingers 2710, 2712 may allow cup member 2704 to more readily receive objects such as a toy dart (by providing a notch to receive a tail of the toy dart) or a toy airplane (by providing a notch to receive the fuselage of the toy airplane).

However, the radius of the inner surface of cup member 2704 increases as it extends toward and including fingers 2710, 2712. Thus, while fingers 2710, 2712 curve inward, they do so at a radius that is greater than the radius of the curve of the inner surface of the cup member near its base (e.g., the end nearest handle 2702). Accordingly, a ball placed within cup member 2704 sized to be received by cup member 2704 and fingers 2708, 2706 may not touch fingers 2710, 2712 (See, e.g., FIG. 3.). In this embodiment, particularly when used to launch a ball, fingers 2710, 2712 function to direct the trajectory of the ball when launched by a throwing device in which throwing arm 2700 is deployed. Preferably, fingers 2710, 2712 operate to direct a trajectory that is substantially parallel to a horizontal plane of the body of the throwing device in which throwing arm 2700 is deployed (i.e., substantially perpendicular to the throwing arm when in a throwing position).

Fingers 2710, 2712, in combination with fingers 2708, 2706 may function to allow a user to grab an object with cup member 2704. Specifically, when cup member 2704 is pressed onto an object, such as a ball, fingers 2708, 2706 may grip the ball and secure the ball within cup member 2704 while fingers 2710, 2712 aid in the control of the ball and, for example, minimize rolling of the ball as cup member 2704 is pressed onto it. Thus, a cup member, such as cup member

2704, when deployed in a throwing device may allow a user to pick up an object without directly touching the object and launch the object in a relatively straight and relatively repeatable trajectory.

When deployed in a throwing device, throwing arm 2700 may be attached to the body of the throwing device at pivot point 2714. A spring adapted to actuate throwing arm 2700 may be attached to throwing arm 2700 at attachment point 2716. Engaging member 2718 may be received by a notch of a trigger of a throwing device in which throwing arm 2700 is deployed.

In the embodiment illustrated in FIGS. 27A-27G, attachment point 2716 is just below and is to the rear of pivot point 2714. In some embodiments, the center of an attachment point is between about 0.05 inches and about 0.2 inches below (i.e., in a direction substantially perpendicular to handle 2702 of throwing arm 2700) the center of a pivot point. In a particular embodiment, the center of an attachment point is about 0.1 inch below the center of a pivot point. In another embodiment, the center of an attachment point is more than 0.2 inches below the center of a pivot point. In yet another embodiment, the center of an attachment point is less than 0.05 inches below the center of a pivot point.

In some embodiments, the center of an attachment point is between about 0.5 inch and about 2 inches to the rear (i.e., in a direction substantially parallel to handle 2702 of throwing arm 2700 away from cup member 2704) of the center of a pivot point. In an example embodiment, the center of an attachment point is between about 0.75 inch and 1.5 inches to the rear of the center of a pivot point embodiment. In a particular embodiment, the center of an attachment point is about 1 inch to the rear of the center of a pivot point. In another embodiment, the center of an attachment point is less than 0.5 inch to the rear of the center of a pivot point. In yet another embodiment, the center of an attachment point is more than 2 inches to the rear of the center of a pivot point.

FIGS. 28A-28E illustrate throwing arm 2800 according to another example embodiment. Throwing arm 2800 may be deployed in a throwing device of one or more of FIGS. 1-26 or may be deployed in other embodiments of throwing devices.

Throwing arm 2800 includes handle 2802 and cup member 2804. Cup member includes fingers 2808, 2806 extending upward from a first side edge and second side edge, respectively, of cup member 2804 and are disposed toward the middle of cup member 2804. Fingers 2808, 2806 curve inward the center of cup member 2804 and flare toward the base (e.g., toward the end nearest handle 2802) of cup member 2804.

Fingers 2810, 2812 extend upward from an upper edge of cup member 2804.

In comparison to cup member 2704, the radius of cup member 2804 is more constant. However, the radius of cup member 2804 decreases slightly at fingers 2810, 2812.

When deployed in a throwing device, throwing arm 2800 may be attached to the body of the throwing device at pivot point 2814. A spring adapted to actuate throwing arm 2800 may be attached to throwing arm 2800 at attachment point 2816. A secondary spring, e.g., a spring adapted to slow the forward motion of throwing arm 2800 upon launch, may be attached to throwing arm 2800 at attachment point 2820.

Engaging member 2818 may be received by a notch of a trigger of a throwing device in which throwing arm 2800 is deployed.

In some embodiments of a cup member, the radius of the inner surface of the cup member may be non-constant in a direction between the base of the cup member and the top of the cup member. For example, in some embodiments, the radius increases from a first radius at or near the base (for example, the first radius may approximate the radius of a ball to be used with the throwing device) to a second radius toward the top of the cup member, wherein the second radius is greater than the first radius. In other example embodiments, the radius decreases from a first radius at or near the base (for example, the first radius may approximate the radius of a ball to be used with the throwing device) to a second radius toward the top of the cup member, wherein the second radius is less than the first radius. In yet other embodiments, the radius of the cup member is relatively constant in a direction between the base of the cup member and the top of the cup member.

In some embodiments of a cup member, the radius of the inner surface of the cup member may be relatively constant in a direction between a first side of the cup member and a second side of the cup member. In some such embodiments, the radius of one or more fingers on the first and second sides may be substantially the same as such radius of the cup member. In other such embodiments, the radius of one or more of such fingers may be greater than such radius of the cup member. In yet other embodiments, the radius of one or more of such fingers may be less than such radius of the cup member.

In other embodiments, the radius of the inner surface of the cup member may be non-constant in a direction between a first side of the cup member and a second side of the cup member. For example, the radius may decrease in the direction of the first and second sides of the cup member. In other embodiments, the radius may increase in the direction of the first and second sides of the cup member.

Several embodiments of throwing devices of the invention have been described and shown herein. It should be understood that various changes and modifications to the embodiments described herein will be apparent to those skilled in the art. For example, throwing devices may omit features of one or more of the embodiments illustrated and described herein. Other embodiments may include additional features suitable for use in connection with throwing devices. In each case, such changes, modifications, omissions, and additions can be made without departing from the spirit and scope of the invention and without diminishing its intended advantages.

For example, although the embodiments of the throwing device illustrated herein resemble a gun, other shapes may be used. Furthermore, while front and rear grips are illustrated in the embodiments of FIGS. 1-26, in other embodiments, either or both grips may be excluded, such as in an embodiment adapted to be placed on a stand. In yet other embodiments, grips may be otherwise provided, such as on the top or side of the body of the throwing device. Such alternative grips may be provided in addition to or instead of a front or rear grip.

Cup members of throwing devices of the disclosure may be adapted to hold and launch objects of a particular size or shape or within a particular size range or shape variation. For example, a cup member may be adapted to hold and launch an object about the size and shape of a tennis ball. In other embodiments, a cup member may be adapted to hold and launch objects with a variety of shapes with in a particular size range.

As discussed above, cup members may be adapted to allow a user to use the throwing device to pick up an object to be thrown. In some embodiments, a cup member may be adapted to allow a user to pick up some of a set of objects that could be thrown using the throwing device. For example, a user may be able to pick up a ball using the cup member of a throwing device. That throwing device may also be used to throw a toy dart, but the user may be required to place the toy dart within the cup member.

In some embodiments, a cup member may include one or more holes, e.g., to discourage a user from using a throwing device to throw small rocks, pebbles, or marbles.

In some embodiments, the handle and cup member of a throwing arm are formed as a single unit. In other embodiments, all or part of a cup member or handle may be formed separately and attached to form a throwing arm of a throwing device. In such other embodiments, the portion of the throwing device that is or includes the cup member (or part of the cup member) may be generally permanently attached or, alternatively, may be releasably attached (as in throwing device 700). In embodiments in which the cup member portion is releasably attached, the handle of the throwing arm may be adapted to receive any one of a plurality of cup members. In such embodiments, a plurality of cup members may be provided with the throwing device wherein each cup member is adapted to hold and launch a particular object or type of object. For example, cup members may be adapted to hold and launch one or more of a tennis ball, football, dart, flying disc, clay pigeon, or paintball. In addition, or in the alternative, cup members may be adapted to hold and launch objects such as stuffed ducks or birds for hunting dog training. A user of a throwing device of such an embodiment may select a cup member based on the particular object to be used with the throwing device, e.g., in a throw and catch game.

Springs with a variety of spring constants may be used as launching springs, trigger springs, and secondary springs in embodiments of throwing devices of the disclosure.

Launching springs may be selected by spring constant based on one or more of an anticipated weight range of objects to be used in connection with the throwing device, a desired launch distance or range of launch distances, length of the throwing arm, or may be otherwise selected. For example, in one embodiment, a launching spring is selected to provide sufficient force upon release of tension within the launching spring to shoot or launch a relatively lightweight object a distance of 36 to 68 feet. In another embodiment, a launching spring is selected to shoot or launch a relatively lightweight object a distance of 40 to 60 feet. In yet another embodiment, a launching spring is selected to shoot or launch a relatively lightweight object a distance up to 80 feet. Other launch distances may be preferred for other throwing devices and launching springs may be selected accordingly.

In an embodiment of a throwing device adapted to allow a user to pick up an object with a cup member, the spring constant of the launching spring is preferably sufficient to maintain the position of the throwing arm at or near the throwing end while the cup member is being pushed onto an object to be thrown.

In the embodiments illustrated in FIGS. 1-26, the launching spring is illustrated as deployed horizontally, e.g., coiled along an axis generally in line with the launching arm when cocked. However, in other embodiments, the launching spring may be otherwise deployed. For example, a launching spring may be a torsion spring coiled about the axis of the pivot point of the throwing arm and may include a first end attached to or incorporated within the throwing arm and a second end attached to or incorporated within a front grip of the throwing device. In such an embodiment, cocking the throwing device may introduce a tension in the launching spring by twisting the coil. When the throwing device is fired by activating the trigger, the launching spring may exert a torque on the throwing arm at the pivot point causing it to rotate from a cocked position to a throwing position.

Suitable trigger release or cocking mechanisms other than (or in addition to) those shown and described herein may be used in connection with other embodiments of throwing devices of the invention. In yet other embodiments, a separate trigger may be omitted and a throwing arm may be adapted to cock and launch by user actions applied directly to the throwing arm.

Although particular features are shown to connect various components to one another, other suitable features or devices may be used. For example, although the embodiments generally illustrate launching spring as attached to the throwing arm via a hook around a pin, other suitable connection methods or mechanisms may be used. Similarly, although the launching spring is illustrated as attached to the tension adjustment member (in those embodiments that include this feature) via a hook on an end of the tension adjustment member adapted to receive a hook or loop on an end of the launching spring, other suitable connection methods or mechanisms may be used or, in other embodiments, a tension adjustment member may be formed as an integral part of the rear of the launching spring.

Other features may be included with throwing devices of the disclosure. For example, a throwing device may include a cap gun charge firing mechanism wherein a cap gun charge can be loaded into the throwing device and discharged, for example, by impact upon the forward movement of a throwing arm. An embodiment of a throwing device that includes a cap gun charge firing mechanism may be particularly suited for use in training hunting and retrieving dogs. For example, a cup member of such a throwing device may be adapted to receive a stuffed duck (or other bird). The cap gun charge may discharge when the throwing arm of the throwing device moves forward and strikes the charge thereby simulating the sound of gunshot as the stuffed duck (or other bird) is launched forward. The throwing device can therefore be used to acclimate the dog to the sound of gunshot and to retrieve the stuffed duck (or other bird).

In another embodiment, a throwing device may be affixed to a stationary object. In such an embodiment, the geometry of the launching spring and spring-actuated throwing arm allow the throwing device to provide repeatable "pitches" to a practicing hitter or "serves" to a practicing tennis player. Throwing devices of the invention could also be used for catching practice with a variety of balls for a variety of sports, such as baseball or lacrosse.

In yet another embodiment, a throwing device includes a safety feature, such as a lever or knob that must be released before a trigger can be pulled (or before the throwing arm can be otherwise released from the body of a throwing device).

In general, a variety of materials may be used to form the component parts of a throwing device of the disclosure. Springs, for example, are preferably formed from spring steel; however other materials with suitable rigidity and elasticity may be used. A thermoplastic (e.g., acrylonitrile butadiene styrene) may be used for components of a body or shroud of some embodiments of a throwing device. In other embodiments, one or more of such component parts may be formed from suitable nylons, polypropylenes, polyurethanes, glass fiber, or carbon fiber, and/or combinations thereof. In yet other embodiments, one or more of such parts may be formed from metal.

Launching devices may be provided in a variety of sizes. As an initial matter, a preferred size of a particular embodiment will be dictated in part by the size of the throwing arm and its associated cup member selected for the embodiment of the launching device. In an example embodiment in which the cup member is adapted to hold an object about the size of a tennis ball, the body of the throwing device may be about 12 inches long to accommodate a throwing arm that is about 10.25 inches long, may include a front grip that extends about 4 inches from the body, and may include a rear grip that extends about 3 inches from the body. In other embodiments, a throwing device may be between about 6 inches long to about 20 inches long (e.g., about 6 inches, 7 inches, 8 inches, 9 inches, 10 inches, 11 inches, 12 inches, 13 inches, 14 inches, 15 inches, 16 inches, 17 inches, 18 inches, 19 inches, or 20 inches) to accommodate a throwing arm that about 5 inches long to about 20 inches long (e.g., about 5 inches, 6 inches, 7 inches, 8 inches, 9 inches, 10 inches, 11 inches, 12 inches, 13 inches, 14 inches, 15 inches, 16 inches, 17 inches, 18 inches, 19 inches, or 20 inches). In another embodiment, the throwing device is less than 6 inches long. In yet another embodiment, the throwing device is more than 20 inches long.

In certain embodiments, the throwing arm, when deployed in a throwing device, does not extend beyond the rear of the body of the throwing device when in a cocked position.

In other embodiments, the cup member (e.g., fingers of the cup member) extends beyond the rear of the body of the throwing device when in a cocked position. For example, fingers (such as fingers 2710, 2712, 2810, 2812) may extend between about $1/8^{th}$ of an inch to about an inch beyond the rear of the body of the throwing device (e.g., about $1/8^{th}$ inch, $1/4$ inch, $1/2$ inch, $3/4$ inch or 1 inch). This embodiment may be particularly suited for embodiments of a throwing device which include a shroud, because the extension of the fingers beyond the shroud and rear of the throwing device may provide a grip for a user to move the throwing arm into a cocked position.

In general, materials that are the same as or similar to those used for a body or shroud of a throwing device may be used for a throwing arm and cup member of a throwing device. However, a relatively strong material is preferred for such components. The relative strength preferred in a particular embodiment may vary based on the size of the throwing arm and cup member, the spring constant of the launching spring, the impact zone (if any) of the throwing arm upon firing (e.g., against a stop 182, 582), the recommended weight limit of objects thrown with the throwing device, and the like.

In embodiments in which the cup member includes fingers, fingers of a cup member may be sufficiently elastic (and, therefore, formed from a material with sufficient elasticity) to move apart when pressed onto an object (such as a ball), to hold the object with relative security when at rest, and to substantially recover their shape following deformation upon being pressed onto an object and following the forced release of the object from the cup when the throwing arm of the throwing device is released from the body (e.g., by pulling a trigger).

In an example embodiment, a throwing arm and cup member are formed from glass filled (or reinforced) polypropylene. Other suitable materials, such as glass filled (or reinforced) nylon may be used.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A device for throwing balls, toys or other safe objects comprising:
   a throwing arm comprising a cup member and a handle, wherein the throwing arm is adapted to be cocked in a cocked position;
   a launching spring adapted to actuate the throwing arm about a pivot point from the cocked position to a throwing position;
   a shroud which substantially encloses the throwing arm along the arc from the cocked position to the throwing position, wherein the shroud comprises an opening along the arc to allow a user to move the throwing arm to the cocked position; and
   wherein the cup member is adapted to receive an object.

2. The throwing device of claim 1 wherein the throwing position is substantially perpendicular to the cocked position.

3. The throwing device of claim 1 wherein the launching spring is attached at a first end to the handle of the throwing arm and at a second end to a tension adjustment member, wherein the tension adjustment member is adapted to alter the tension applied to the throwing arm by the launching spring.

4. The throwing device of claim 1 wherein the cup member further comprises a base end, a top end, a first side edge, a second side edge, and an inner surface and wherein a radius of the inner surface of the cup member increases between the base end and the top end.

5. The throwing device of claim 4 wherein the cup member further comprises a first finger extending upward from the first side edge, a second finger extending upward from the second side edge, and at least one finger extending from the top end.

6. The throwing device of claim 5 wherein the cup member further comprises a second finger extending from the top end and a notch disposed between the at least one finger and the second finger.

7. The throwing device of claim 5 wherein the cup member is adapted to releasably grip an object when pressed onto the object while the throwing arm is in the throwing position.

8. The throwing device of claim 4 wherein a radius of the inner surface of the cup member between the first side edge and the second side edge is substantially constant.

9. The throwing device of claim 1 wherein the cup member is adapted to receive a disc-shaped object.

10. The throwing device of claim 9 wherein the cup member is adapted to receive a flying disc.

11. The throwing device of claim 9 wherein the cup member is adapted to receive a clay pigeon.

12. The throwing device of claim 1 wherein the cup member further comprises a finger adapted to be gripped through the opening and moved along the opening to move the throwing arm into the cocked position.

13. The throwing device of claim 1 further comprising a stop adapted to terminate forward movement of the throwing arm at the throwing position.

14. The throwing device of claim 1 wherein the throwing device is adapted to launch the object gripped by the cup member in a substantially repeatable trajectory when the throwing device reaches the throwing position.

15. The throwing device of claim 14 wherein the trajectory begins in a direction that is substantially perpendicular to the throwing arm when in the throwing position.

16. The throwing device of claim 1 wherein the cup member is adapted to releasably grip a plurality of objects.

17. The throwing device of claim 1 further comprising a secondary spring wherein the secondary spring is attached at a first end to the handle of the throwing arm and is attached within a front portion of the throwing device at a second end, and wherein the secondary spring is adapted to moderate forward movement of the throwing arm when the throwing arm is released from the cocked position.

18. A device for throwing balls, toys or other safe objects comprising:
- a throwing arm comprising a cup member and a handle, wherein the throwing arm is adapted to be cocked in a cocked position;
- a launching spring adapted to actuate the throwing arm about a pivot point from the cocked position to a throwing position;
- wherein the cup member is adapted to receive an object; and
- wherein the throwing device further comprises a shroud which substantially encloses the throwing arm along an arc from the cocked position to the throwing position, and wherein the shroud comprises an opening along the arc and a slide adapted to engage the cup member of the throwing arm through the opening in the shroud.

19. The throwing device of claim 18 wherein the cup is adapted to receive a disc-shaped object.

20. The throwing device of claim 19 wherein the cup member is adapted to receive a flying disc.

21. The throwing device of claim 19 wherein the cup member is adapted to receive a clay pigeon.

22. The throwing device of claim 18 wherein the cup member comprises a plurality of fingers and is adapted to releasably grip an object.

23. The throwing device of claim 18 wherein the cup member further comprises a base end, a top end, a first side edge, a second side edge, and an inner surface and wherein a radius of the inner surface of the cup member increases between the base end and the top end.

24. A device for throwing balls, toys or other safe objects comprising:
- a throwing arm comprising a cup member and a handle, wherein the throwing arm is adapted to be cocked in a cocked position;
- a launching spring adapted to actuate the throwing arm about a pivot point from the cocked position to a throwing position;
- wherein the cup member comprises a base end, a top end, a first side edge, a second side edge, and an inner surface, wherein a radius of the inner surface of the cup member increases between the base end and the top end, wherein the cup member further comprises a first finger extending upward from the first side edge, a second finger extending upward from the second side edge, and at least one finger extending from the top end, and wherein the cup member is adapted to releasably grip an object; and
- wherein the throwing device further comprises a shroud substantially enclosing the throwing arm along an arc from the cocked position to the throwing position, and wherein the shroud comprises an opening along the arc and a slide adapted to engage the cup member of the throwing arm through the opening in the shroud.

25. The throwing device of claim 24 wherein a portion of the cup member extends beyond the opening of the shroud.

26. The throwing device of claim 24 wherein the cup member is removable from the handle of the throwing arm, the throwing device further comprising a second cup member adapted to be removably attached to the handle of the throwing arm.

27. The throwing device of claim 24 wherein the launching spring is attached at a first end to the handle of the throwing arm and at a second end to a tension adjustment member, wherein the tension adjustment member is adapted to alter the tension applied to the throwing arm by the launching spring.

28. The throwing device of claim 24 wherein the cup member is adapted to releasably grip an object when pressed onto the object while the throwing arm is in the throwing position.

* * * * *